United States Patent
Nakai et al.

(10) Patent No.: US 7,129,685 B2
(45) Date of Patent: Oct. 31, 2006

(54) DC/DC CONVERTER CONTROL SYSTEM

(75) Inventors: Hideo Nakai, Nisshin (JP); Hiroki Ohtani, Aichi-gun (JP); Kazunari Moriya, Seto (JP); Kenji Yamada, Toyota (JP)

(73) Assignee: Tokyo Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/180,574

(22) Filed: Jul. 14, 2005

(65) Prior Publication Data

US 2006/0022655 A1 Feb. 2, 2006

(30) Foreign Application Priority Data

Jul. 28, 2004 (JP) ............................. 2004-220897

(51) Int. Cl.
  *G05F 1/618* (2006.01)
(52) U.S. Cl. .................. 323/285; 323/224; 323/282; 323/299
(58) Field of Classification Search ........ 323/222–225, 323/282, 284, 285, 299
See application file for complete search history.

(56) References Cited

U.S. PATENT DOCUMENTS 4,672,303 A * 6/1987 Newton ..................... 323/285
6,426,612 B1 * 7/2002 Rozsypal .................. 323/282

FOREIGN PATENT DOCUMENTS

JP  A 2004-120844  4/2004

* cited by examiner

*Primary Examiner*—Gary L Laxton
(74) *Attorney, Agent, or Firm*—Oliff & Berridge, PLC

(57) ABSTRACT

A switching operation of two switching elements is controlled by a controller. Specifically, by adjusting the duty ratio concerning the lower switching element, a capacitor voltage is controlled to a target value. This control is executed not only by simply performing a PI control with respect to the capacitor voltage based on a deviation from the target value, but also by performing feedback control with respect to battery power and output energy. Further, a scheduling factor based on battery voltage, capacitor voltage, and the like is employed to control the gain of the feedback control.

16 Claims, 22 Drawing Sheets

DC/DC CONVERTER CONTROL SYSTEM

BACKGROUND OF THE INVENTION

1. Field of the Invention

The present invention relates to control of a DC/DC converter for increasing or decreasing a direct current voltage.

2. Description of the Related Art

A DC/DC converter is conventionally used to obtain, from a direct current power source, a direct current voltage which differs from the output voltage of the power source. For example, in hybrid vehicles and electric vehicles, while a high voltage is desired for efficient high-load drive of a motor, it is preferable that the voltage of a battery which serves as the power source be as low as possible. For this reason, a system has been proposed for boosting a battery voltage by means of a DC/DC converter for use as a power source for a motor. Further, DC/DC converters are widely employed in many other cases in which two or more direct current power sources are required. An example DC/DC converter control system is described in Japanese Patent Laid-Open Publication No. 2004-120844. A system according to this publication performs control without using a current sensor.

In this type of system, feedback control is performed with respect to a duty ratio concerning a pair of switches for connecting a terminal of a reactor alternately to the power source and ground. More specifically, the output voltage is measured, and the duty ratio is controlled (by PI control, for example) in accordance with a difference between the measured output voltage and a target voltage, thereby achieving the feedback control.

In typical cases, the output voltage can be controlled to the target value by such a feedback control. However, when the target value is varied or when the state of load changes greatly, a more precise control is necessary.

SUMMARY OF THE INVENTION

The present invention advantageously provides a DC/DC converter control system for attaining precise control of a DC/DC converter.

According to the present invention, control of a DC/DC converter is executed not only by performing a simple feedback control of an output voltage, but also by correcting the feedback control by multiplying an obtained feedback control value by a scheduling factor incorporating the output voltage, power source voltage, a voltage decrease in the power source voltage, and reactance of a reactor. In other words, scheduling is performed based on a voltage equation of the DC/DC converter. With this arrangement, control can be performed with higher accuracy.

DESCRIPTION OF THE PREFERRED EMBODIMENT

Figure 1:
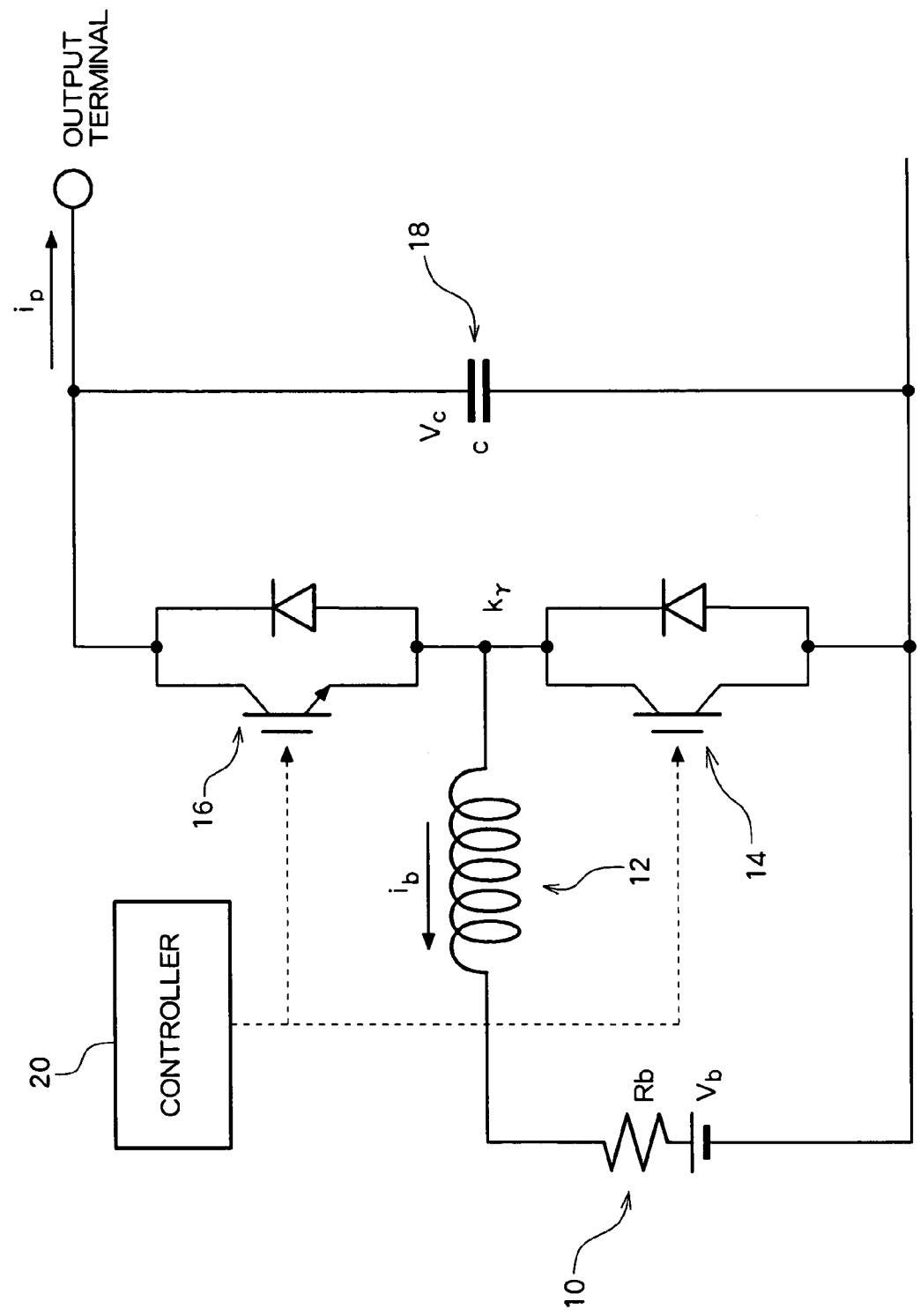
FIG. 1 is a diagram showing a configuration of a DC/DC converter system.

The preferred embodiment of the present invention is next described referring to the drawings.

Voltage Equations of DC/DC Converter

FIG. 1 is a diagram showing a basic configuration of a DC/DC converter. One terminal of a reactor 12 is connected to the positive terminal of a battery 10, which is a direct current source. The other terminal of the reactor is connected to first terminals of two switching elements 14, 16. The second terminal of the switching element 14 is connected to the negative terminal of the battery 10, while the second terminal of the switching element 16 is connected to an output terminal. A capacitor 18 for retaining voltage is provided between the output terminal and the negative terminal of the battery 10. Each of the switching elements 14, 16 is constituted as a structure in which an NPN transistor and a diode are connected in parallel. In the switching element 16, the collector is arranged on the output terminal side while the emitter is located on the reactor 12 side. In the switching element 14, the collector is arranged on the reactor 12 side while the emitter is located on the negative terminal side of the battery 10. In order to allow electric current to flow from the emitter side to the collector side of the transistors in the switching elements 14, 16, the diode in each of the switching elements 14, 16 is arranged such that the anode is connected to the emitter while the cathode is connected to the collector.

In the above-described DC/DC converter, by turning on the switching element 14, a current flows from the positive terminal of the battery 10 toward the negative terminal through the reactor 12, and energy is accumulated in the reactor 12. By turning off the switching element 14, this current flow is stopped. At this point, a voltage increase corresponding to the current flow is generated at a terminal of the reactor 12. A current in accordance with the voltage increase flows toward the output terminal such that the capacitor 18 is charged and the output voltage is increased. When the switching element 16 is turned on, a current flows from the capacitor 18 toward the positive terminal of the battery 10, resulting in a decrease in the output terminal voltage. As such, the output terminal voltage of this DC/DC converter is determined according to a duty ratio of an ON period concerning the switching elements 14, 16. It should be noted that the duty ratio referred to in this specification denotes the ratio of time during which the upper switching element 16 is turned ON.

Voltage equations of the above-described DC/DC converter may be expressed by Equations (1) and (2) below. In the equations, as shown in FIG. 1, $V_b$ denotes voltage of the battery 10, $R_b$ denotes internal resistance of the battery 10, $k_\gamma$ denotes the duty ratio of the switching elements 14, 16, L denotes reactance of the reactor 12, $i_b$ denotes the current which flows in the reactor 12 toward the battery, c denotes capacitance of the capacitor 18, $v_c$ denotes voltage of the capacitor 18, and $i_p$ denotes the current (load current) which flows from the output terminal toward an external load.

While vectors and matrixes are normally expressed using symbols in bold-faced type, symbols denoting vectors and matrixes in the text of the present specification are denoted using ordinary type as used for scalars because bold-faced type may not be clear in printed patent publications.

$$\frac{d}{dt}v_c = \frac{1}{c}(-k_\gamma i_b - i_p) \quad (1)$$

$$\frac{d}{dt}i_b = \frac{1}{L}\{k_\gamma v_c - (R_b i_b + V_b)\} \quad (2)$$

In the present embodiment, a controller 20 controls the switching operation of the switching elements 14, 16 so as to adjust the duty ratio, in order to maintain the output voltage at a target value. The controller 20 receives inputs of battery voltage $V_b$, battery current $i_b$, capacitor voltage $v_c$, and load current $i_p$. Concerning the battery current $i_b$ and load current $i_p$, values estimated by an observer may alternatively be used in place of the actual values.

Derivation of Control Method According to the Preferred Embodiment

The above voltage Equations (1) and (2) for the DC/DC converter are expressed using vectors to be converted into Equation (3).

$$\frac{d}{dt}x = f(x) + g(x)u + B_w i_p \quad (3)$$

$$x' = \begin{pmatrix} v_c \\ i_b \end{pmatrix}, u = k_\gamma$$

$$f(x) = \begin{pmatrix} 0 \\ -\frac{1}{L}(R_b i_b + V_b) \end{pmatrix}, g(x) = \begin{pmatrix} -\frac{1}{c}i_b \\ \frac{1}{L}v_c \end{pmatrix}, B_w = \begin{pmatrix} -\frac{1}{c} \\ 0 \end{pmatrix}$$

Figure 2:
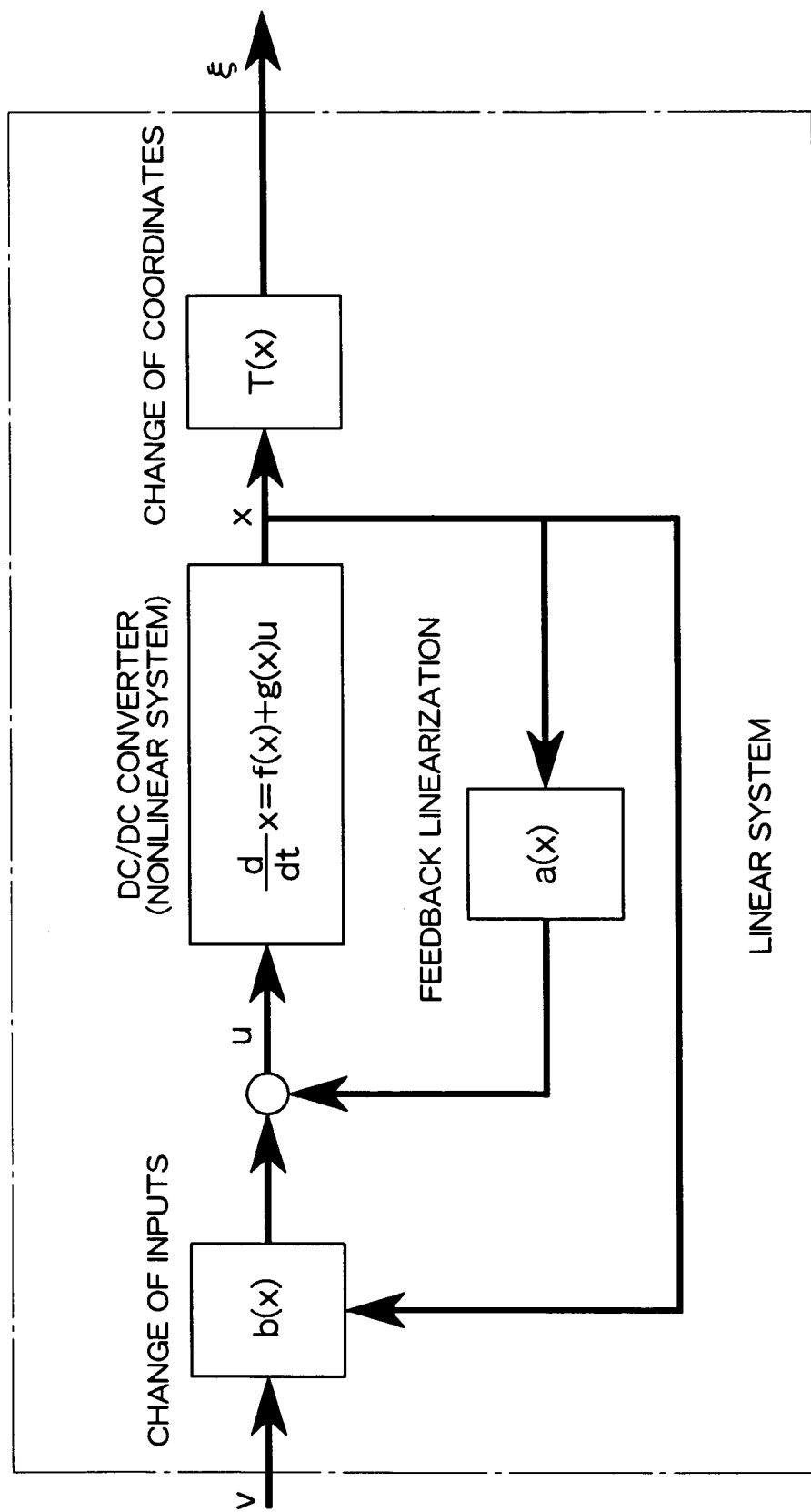
FIG. 2 is a diagram showing a linear configuration of a DC/DC converter system.

Linearization is performed with respect to this Equation (3) by executing a state quantity conversion and a feedback as shown in FIG. 2. As a result of this linearization, a linear system is attained between input v and new output $\xi$ of the DC/DC converter system, allowing the system to be easily controlled by externally providing simple control means.

More specifically, in the system of dx/dt=f(x)+g(x)u having input u and output x, the output x is used to supply a(x) as a feedback to the input side. It should be noted that u and x are not the actual input and output of the DC/DC converter system, as can be seen in FIG. 2. The actual input v is converted into u by b(x) which uses output x. Further, the output x is converted by T(x), and the obtained value $\xi$ is supplied as the output from the DC/DC converter system.

Note that $a(x)=(R_b i_b - V_b)/v_c$, $b(x)=-L_r/(2R_b i_b - V_b)v_c$, and $T(x)=\xi=(\xi_1, \xi_2)$ (column vector) hold true. Also note that $L_r=L$.

Accordingly, $$k\gamma = [(\omega_c^2 2\eta\omega_c)\{T(x_r)-T(x)\}+(K_i 0)\int\{T(x_r)-T(x)\}dt]$$

holds true, which is used in Equation (13) below.

Further, $$v = [(\omega^2 2\eta\omega_c)\{T(x_r)-T(x)\}+(K_i 0)\int\{T(x_r)-T(x)\}dt]$$

holds true, which is used in Equation (11) below. Here, $x_r$ denotes the target value of x.

According to a specific method for the linearization, phi(x) which satisfies the Lee derivatives given by Equations (4) and (5) is calculated.

$$L_{ad_{fg}^0}\phi(x) = \frac{\partial\phi}{\partial v_c}\left(\frac{-i_b}{c}\right) + \frac{\partial\phi}{\partial i_b}\frac{v_c}{L} = 0 \quad (4)$$

$$L_{ad_{fg}^1}\phi(x) = \frac{\partial\phi}{\partial v_c}\left(\frac{R_b}{cL_r} + \frac{1}{L_r}\right) + \frac{\partial\phi}{\partial i_b}\frac{R_b v_c}{L^2} \neq 0 \quad (5)$$

One solution for these Equations (4) and (5) is $\phi(x)=cv_c^2 + L_r i_b^2$.

The above Equation (3) is converted as below using this $\phi(x)$ In other words, the following state equation is obtained assuming $\xi_1=(1/2)\phi(x)$.

$$\frac{d}{dt}\begin{pmatrix}\xi_1 \\ \xi_2\end{pmatrix} = \begin{pmatrix}0 & 1 \\ 0 & 0\end{pmatrix}\begin{pmatrix}\xi_1 \\ \xi_2\end{pmatrix} + \begin{pmatrix}0 \\ 1\end{pmatrix}v + \begin{pmatrix}1 \\ 0\end{pmatrix}w \quad (6)$$

$$\xi_1 = \frac{1}{2}(cv_c^2 + L_r i_b^2) \quad (7)$$

$$\xi_2 = -i_b(R_b i_b + V_b) \quad (8)$$

$$w = -v_c i_p \quad (9)$$

$$v = -\frac{2R_b i_b + V_b}{L_r}v_c\left(k_\gamma - \frac{R_b i_b + V_b}{v_c}\right) \quad (10)$$

Equation (6) shows that the system is linearized concerning input v and output (state quantity) $\xi$.

A section which performs a feedback control of the linearized system is next described. Basic features of the feedback control are that system responsiveness is determined by pole assignment, and that an integral term is introduced in order to reduce a steady-state voltage offset.

The feedback control according to the present embodiment is given by Equations (11) and (12) below, wherein $\xi_{r1}$ and $\xi_{r2}$ denote target values of $\xi_1$ and $\xi_2$.

$$v = (\omega_c^2 \quad 2\eta\omega_c)\begin{pmatrix} \xi_{r1} - \xi_1 \\ \xi_{r2} - \xi_2 \end{pmatrix} + K_i \int (\xi_{r1} - \xi_1) dt \quad (11)$$

$$v = (\omega_c^2 \quad 2\eta\omega_c)\begin{pmatrix} \xi_{r1} - \xi_1 \\ \xi_{r2} - \xi_2 \end{pmatrix} + K_i \int (V_{cr} - v_c) dt \quad (12)$$

In accordance with the above Equations (11) and (12), the actual control of the DC/DC converter is expressed by Equations (13) and (14).

$$k_\gamma = -\frac{L_r}{(2R_b i_b + V_b)v_c} \quad (13)$$

$$\left\{ (\omega_c^2 \quad 2\eta\omega_c)\begin{pmatrix} \xi_{r1} - \xi_1 \\ \xi_{r2} - \xi_2 \end{pmatrix} + K_i \int (\xi_{r1} - \xi_1) dt \right\} + \frac{R_b i_b + V_b}{v_c}$$

$$k_\gamma = -\frac{L_r}{(2R_b i_b + V_b)v_c} \quad (14)$$

$$\left\{ (\omega_c^2 \quad 2\eta\omega_c)\begin{pmatrix} \xi_{r1} - \xi_1 \\ \xi_{r2} - \xi_2 \end{pmatrix} + K_i \int (V_{cr} - v_c) dt \right\} + \frac{R_b i_b + V_b}{v_c}$$

Figure 3:
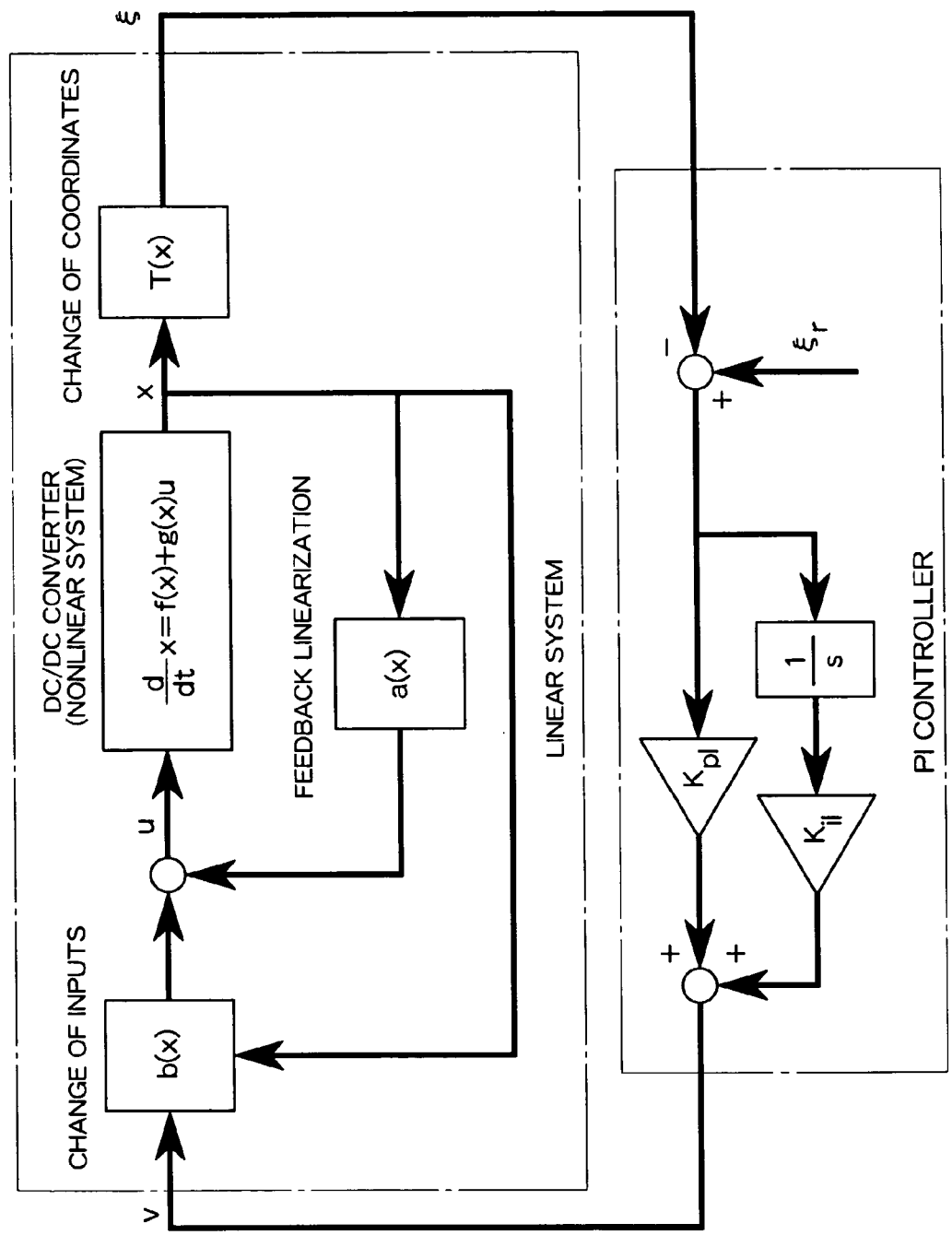
FIG. 3 is a diagram showing a configuration of a DC/DC converter system including a feedback loop.
Figure 4B:
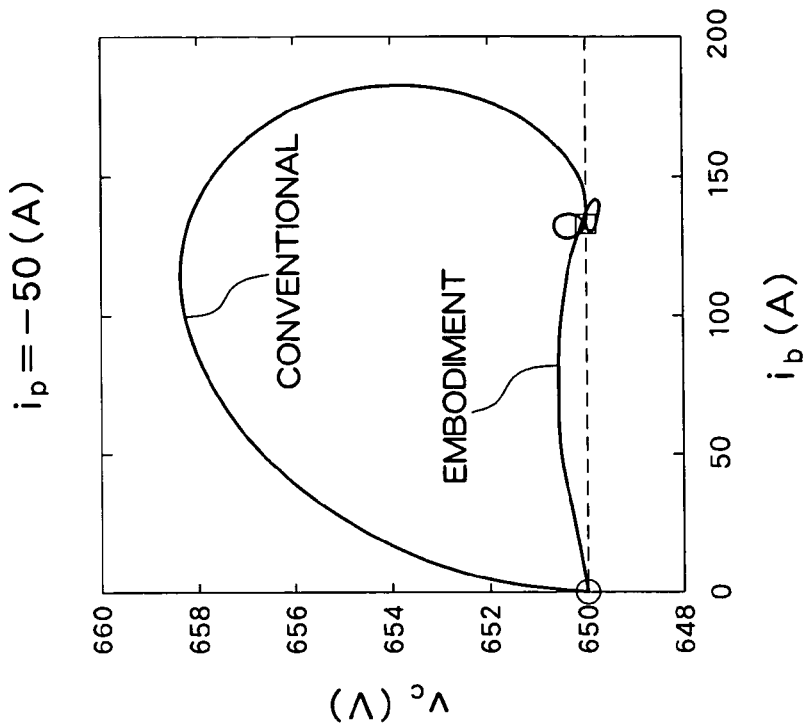
FIGS. 4(a)–4(f) graphically illustrate characteristics of controls executed using a continuous system controller.
Figure 4A:
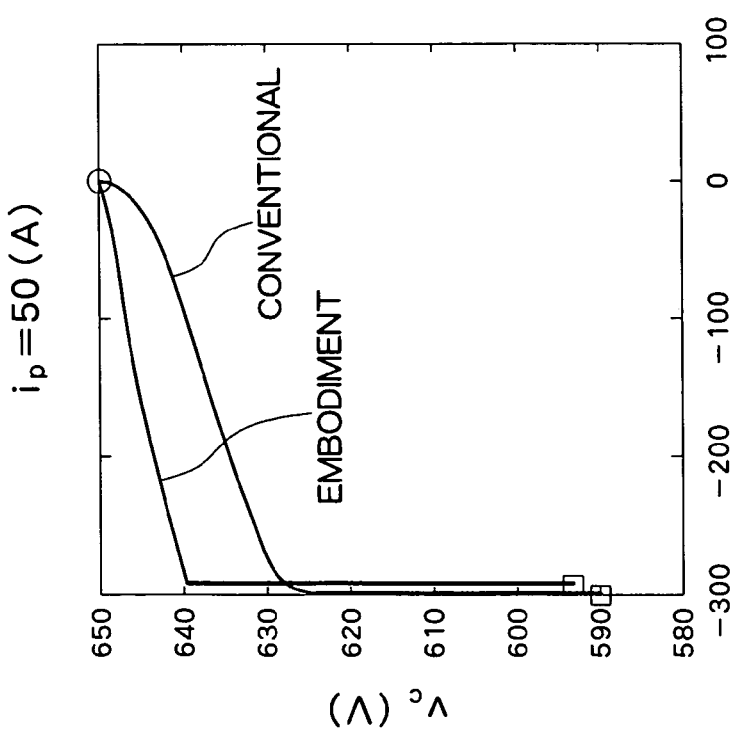
Figure 4C:
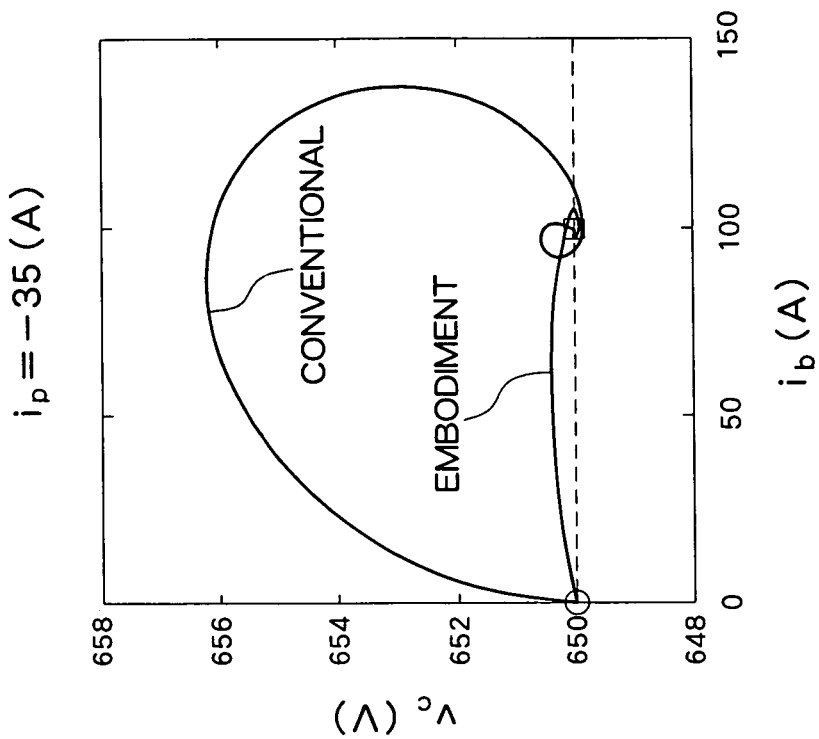
Figure 4D:
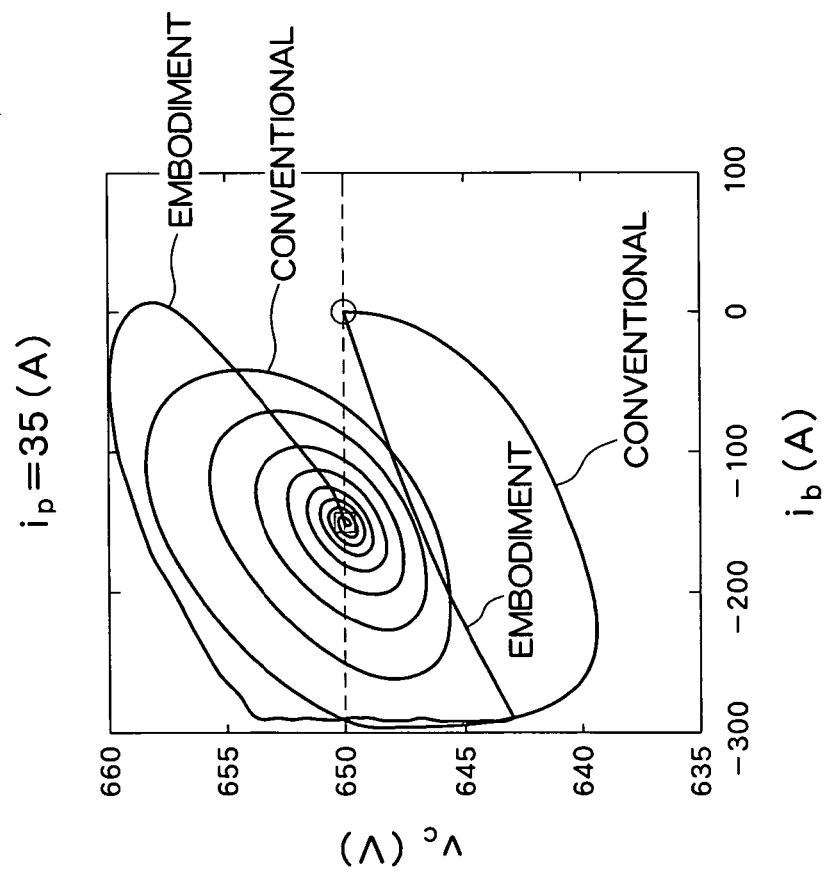
Figure 4F:
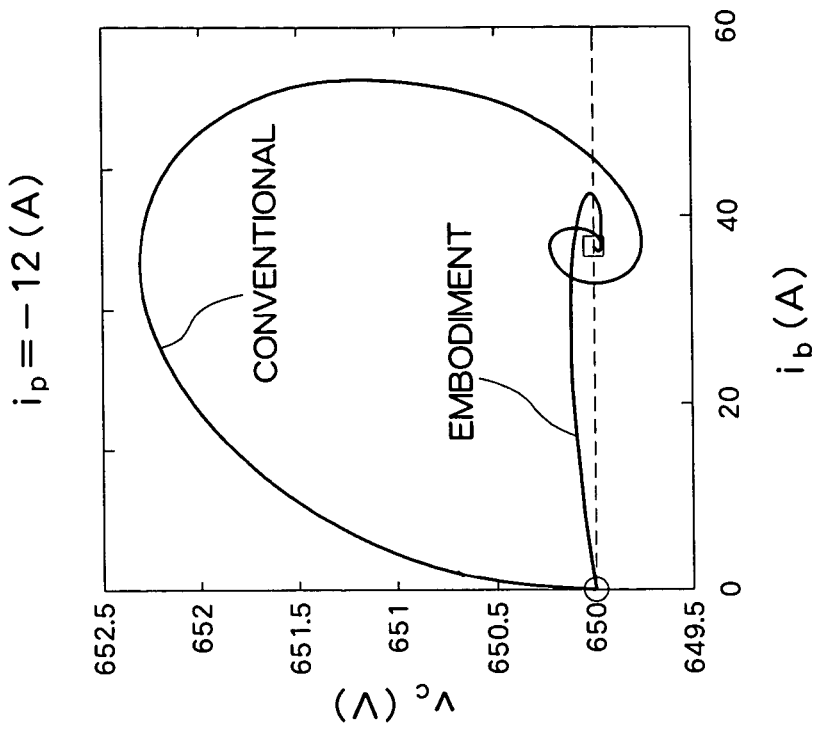
Figure 4E:
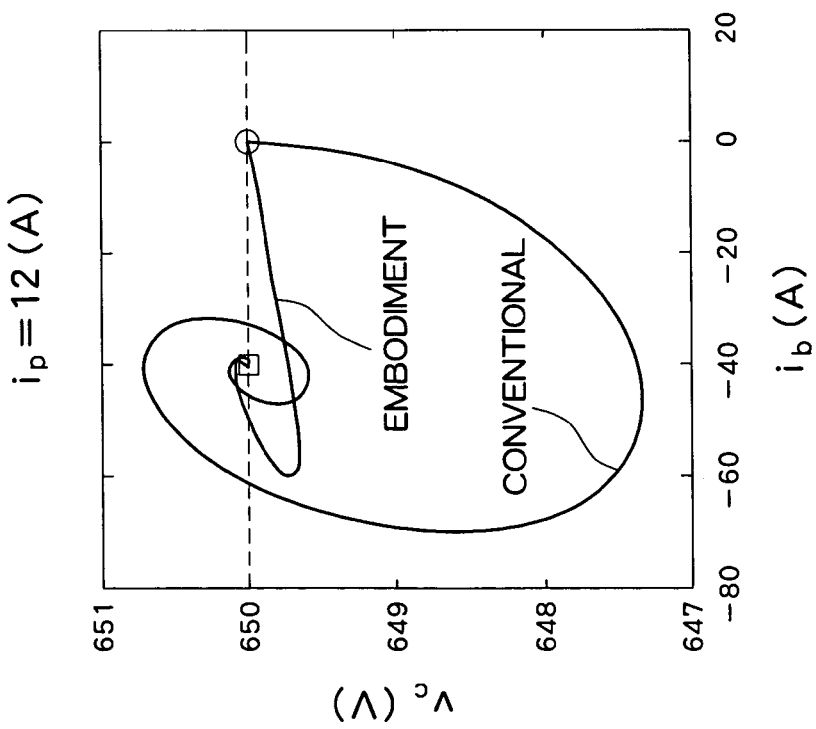
Figure 5:
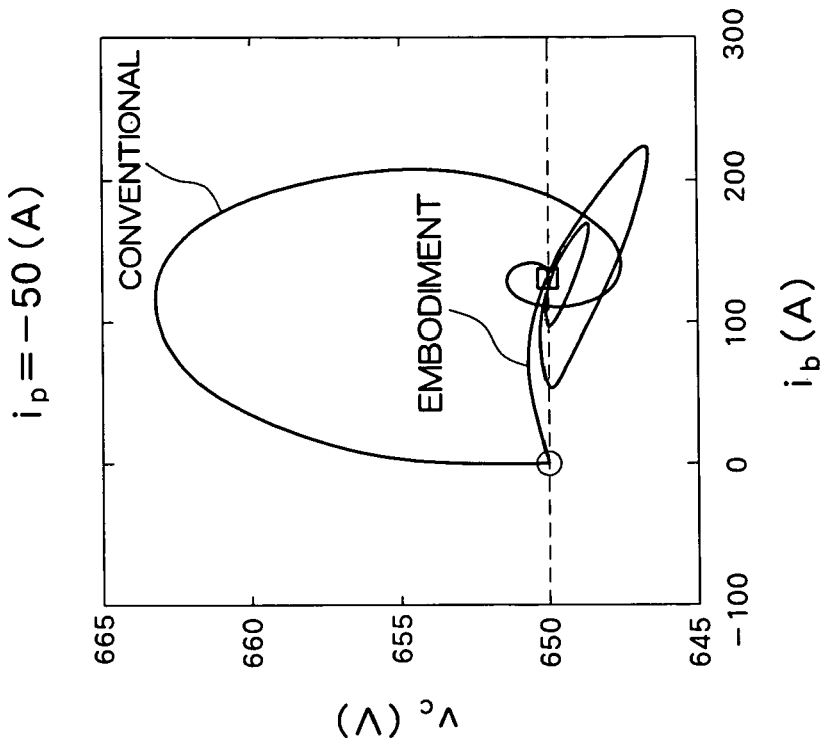
FIGS. 5(a)–5(f) graphically illustrate characteristics of controls executed using a discrete system controller.
Figure 5:
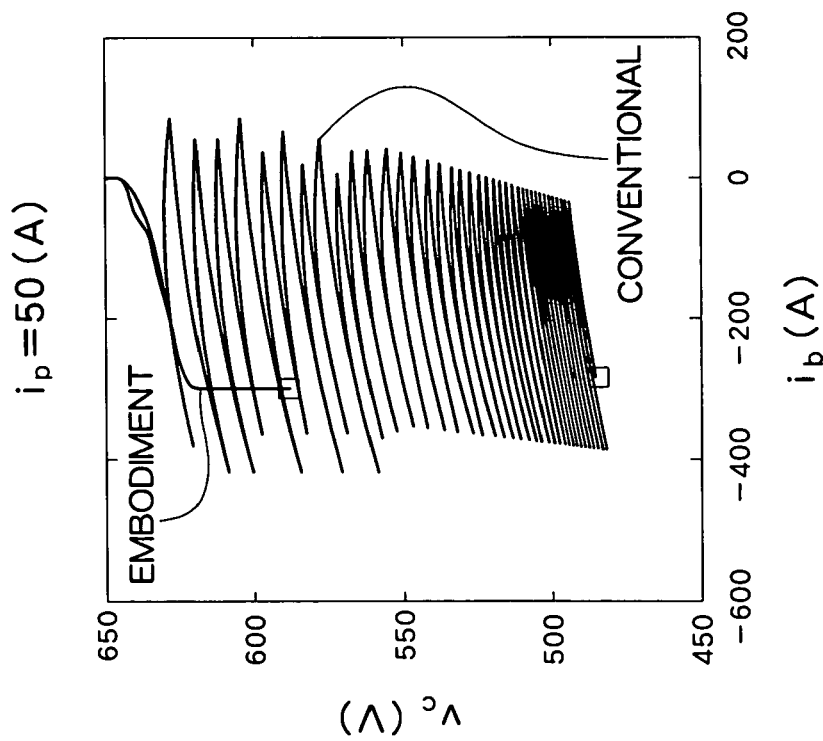
Figure 5D:
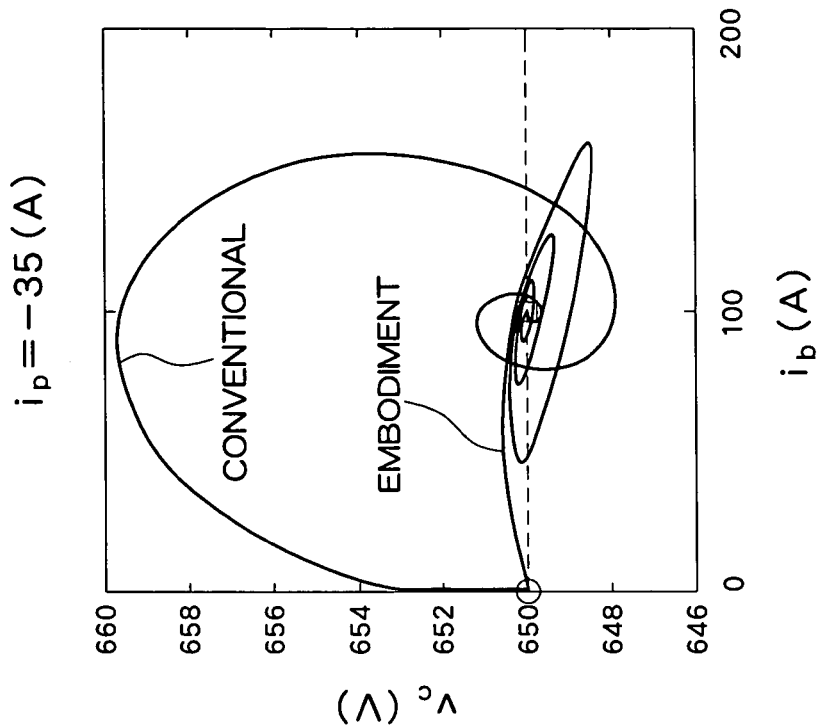
Figure 5C:
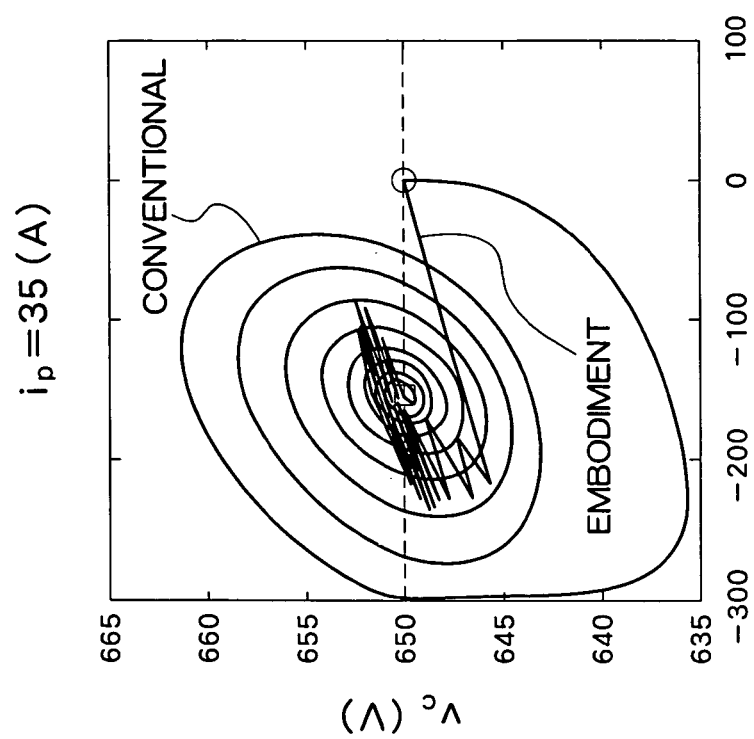
Figure 5F:
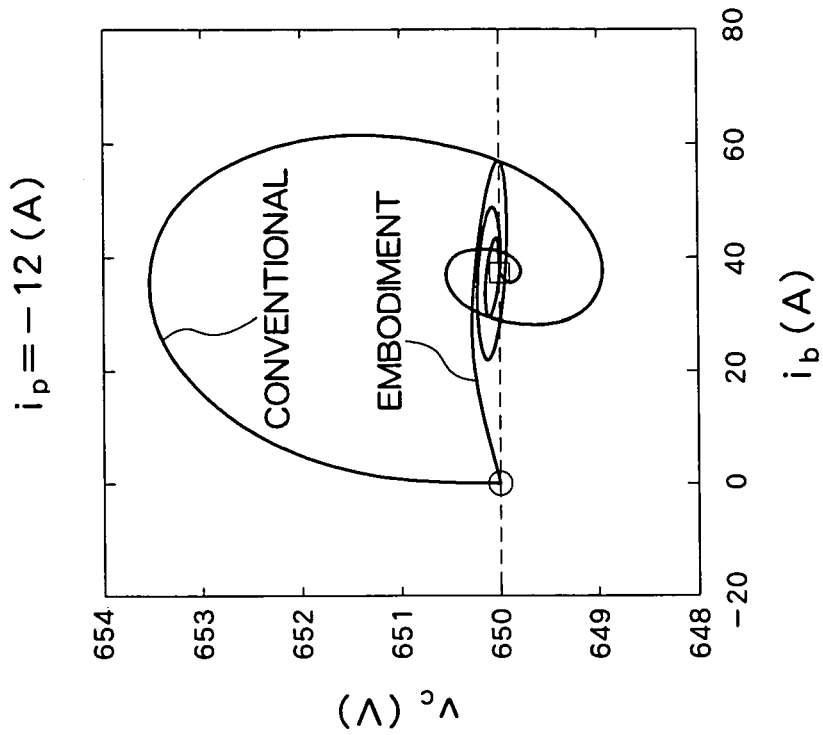
Figure 5E:
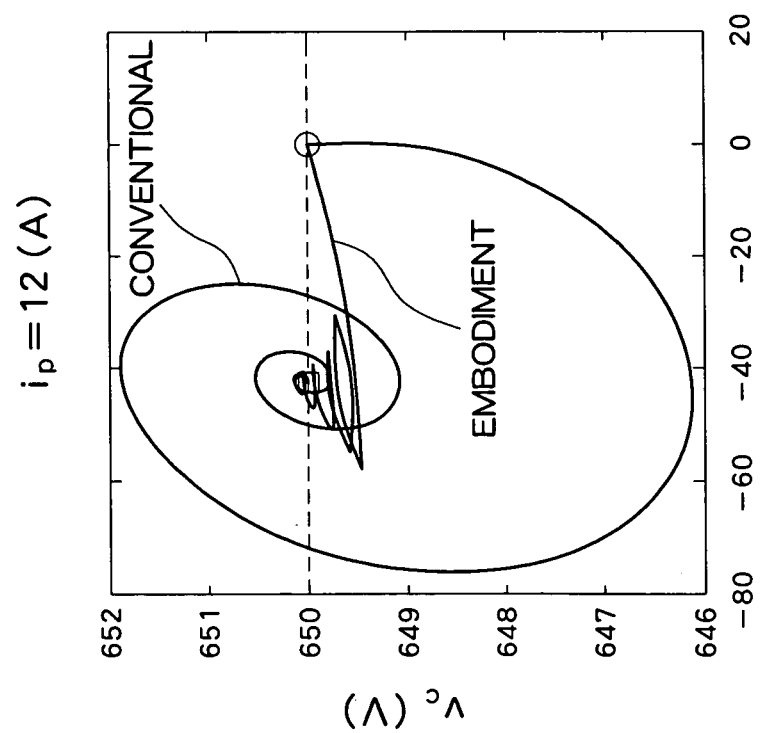
Figure 6B:
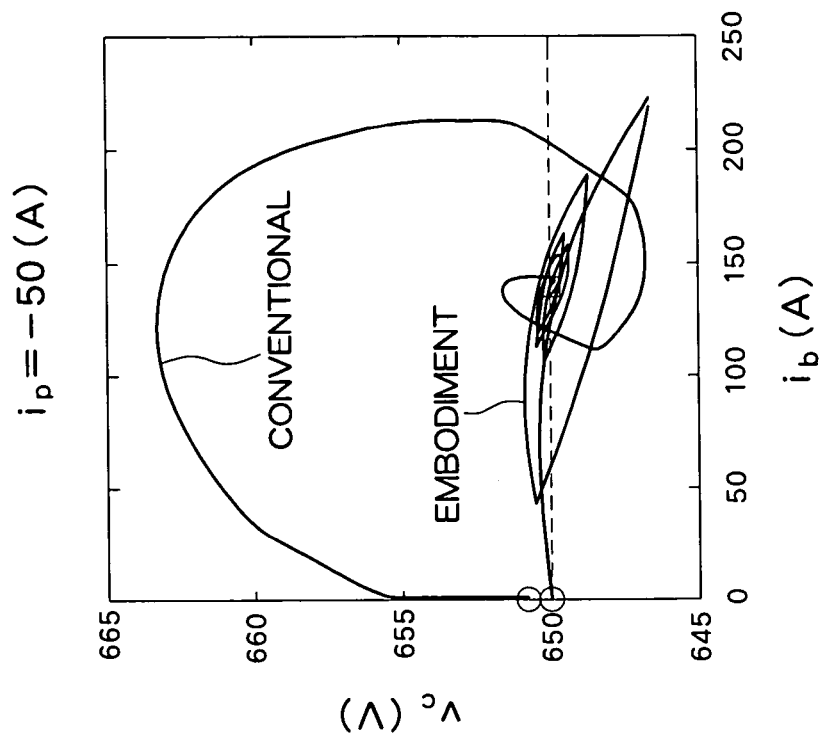
FIGS. 6(a)–6(f) graphically illustrate characteristics of controls executed using a discrete system controller and PWM switching.
Figure 6A:
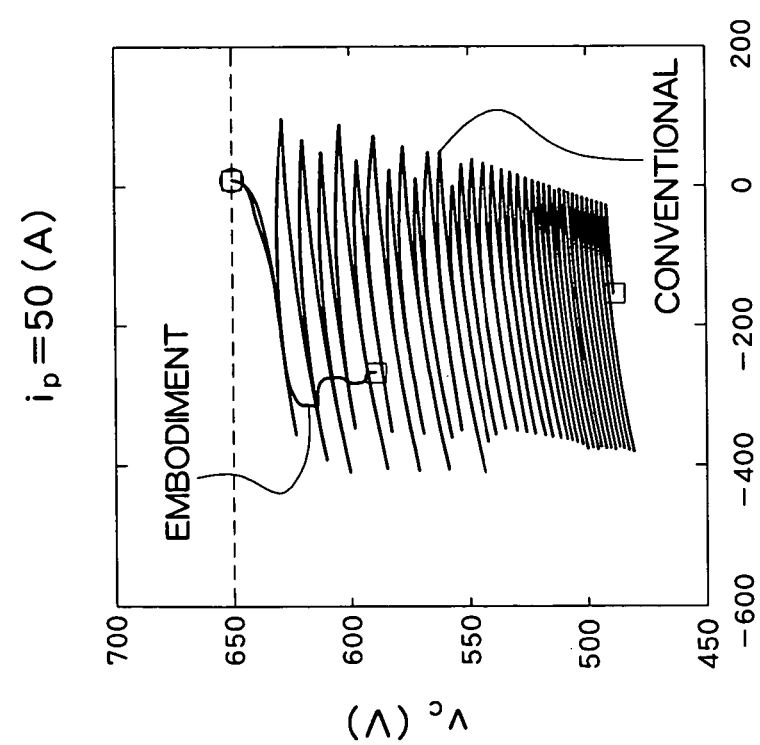
Figure 6D:
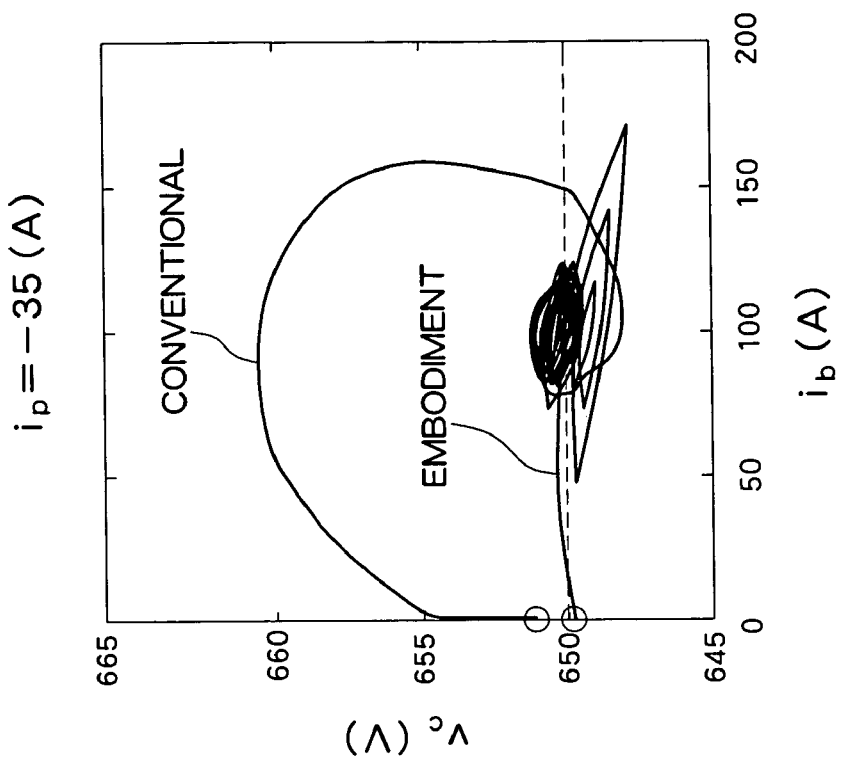
Figure 6C:
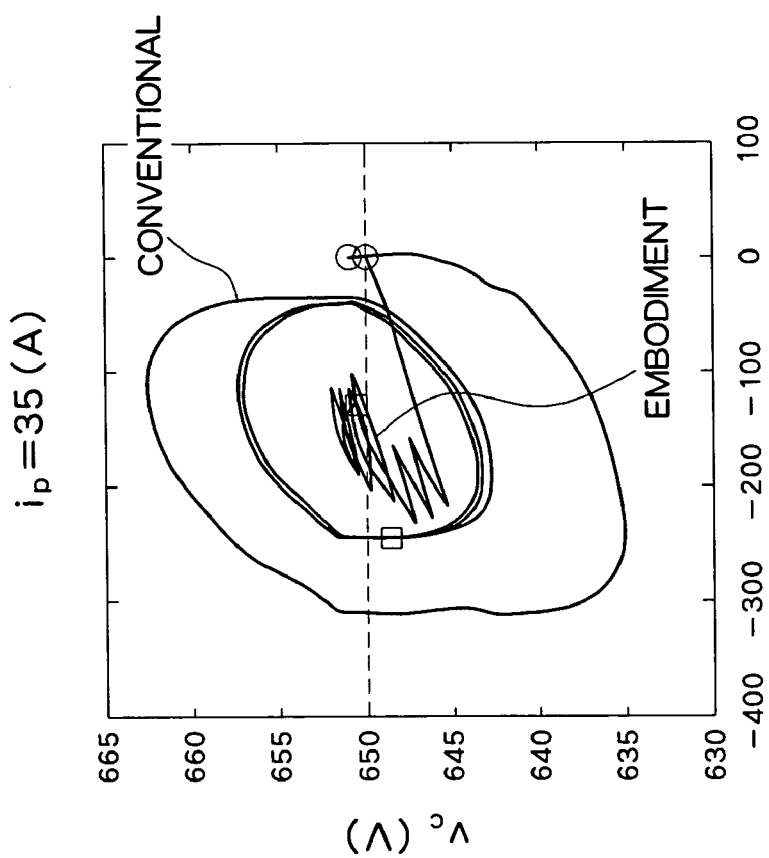
Figure 6F:
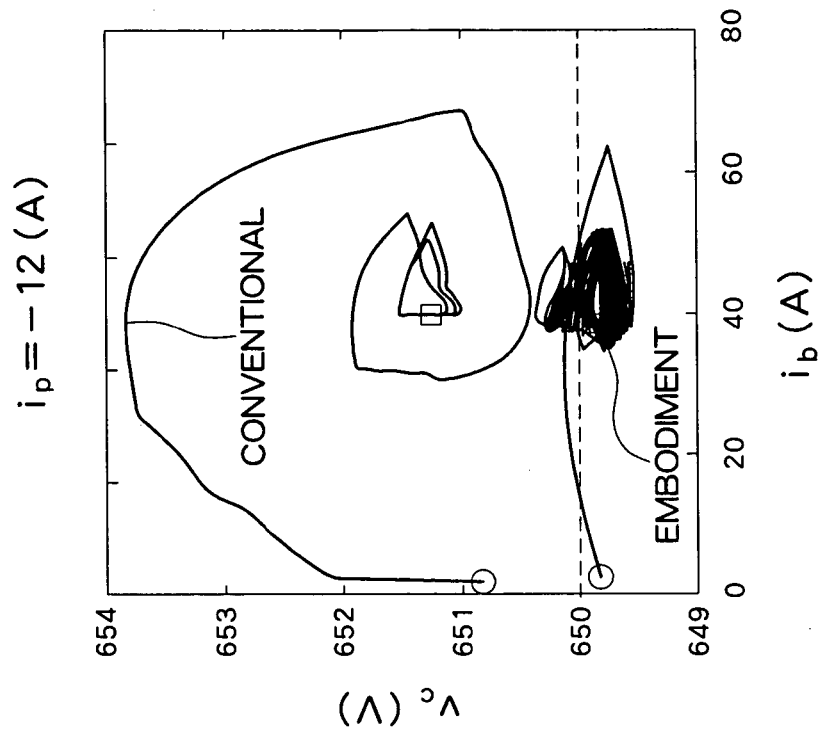
Figure 6E:
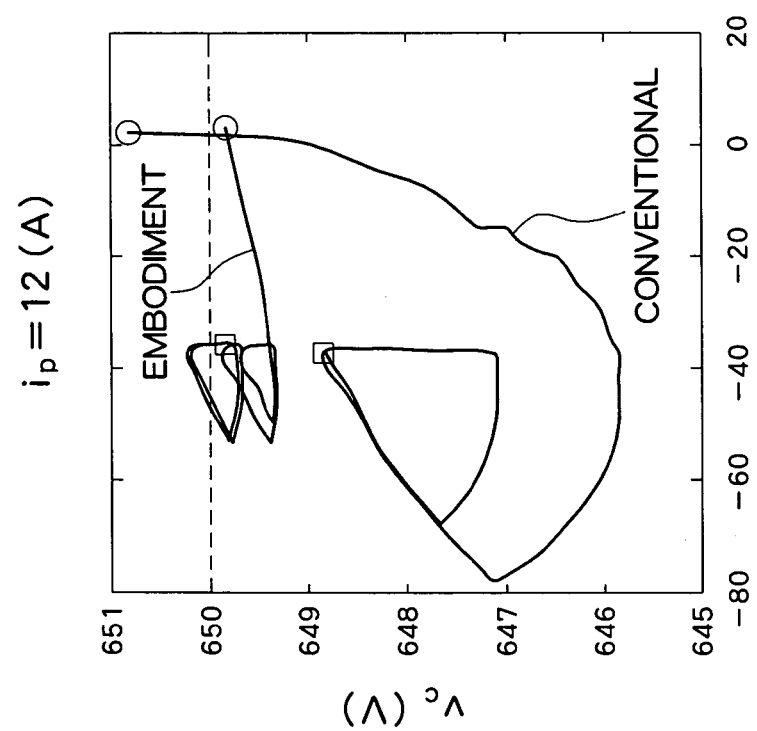
Figure 7B:
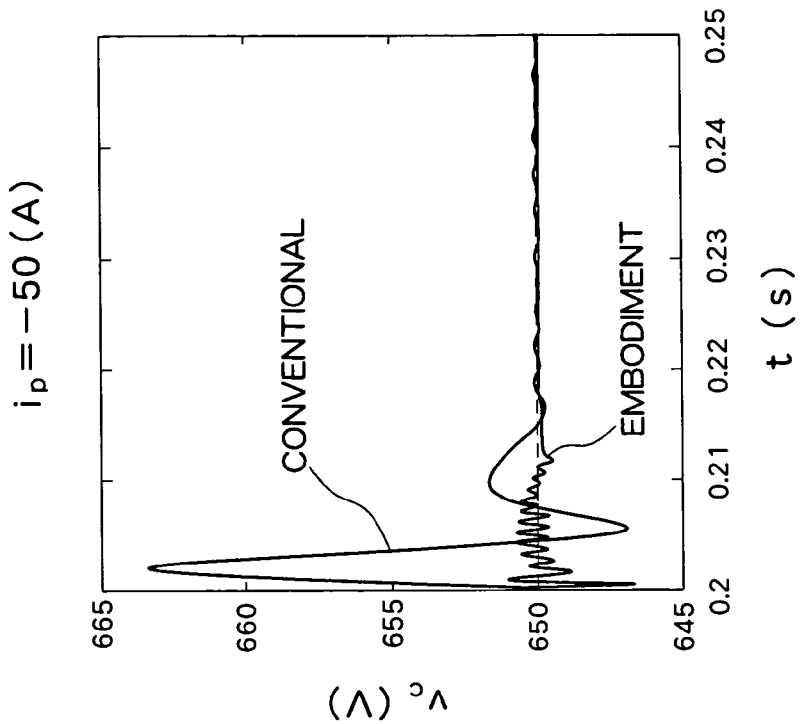
FIGS. 7(a)–7(f) graphically illustrate time responses of capacitor voltage $v_c$ during execution of a control using a discrete system controller and PWM switching.
Figure 7A:
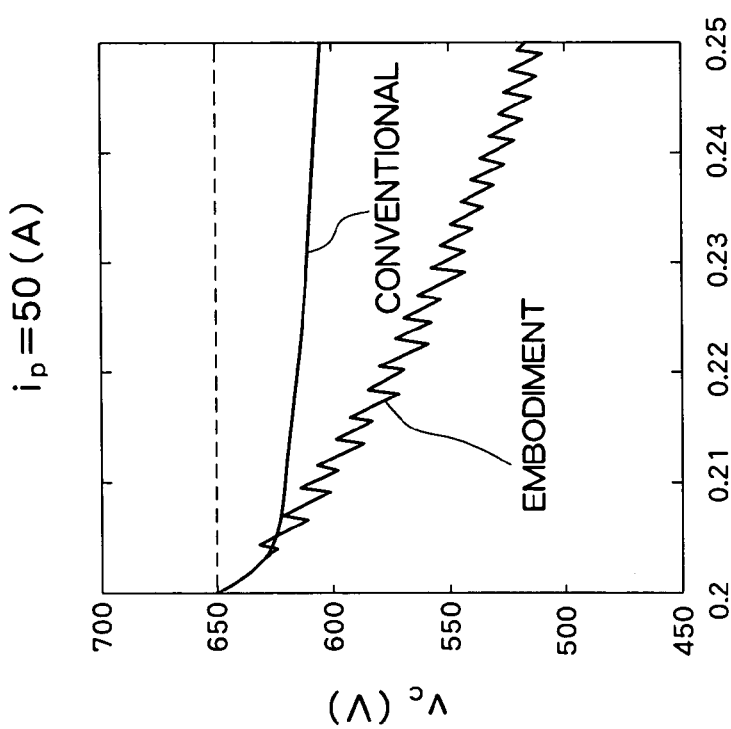
Figure 7D:
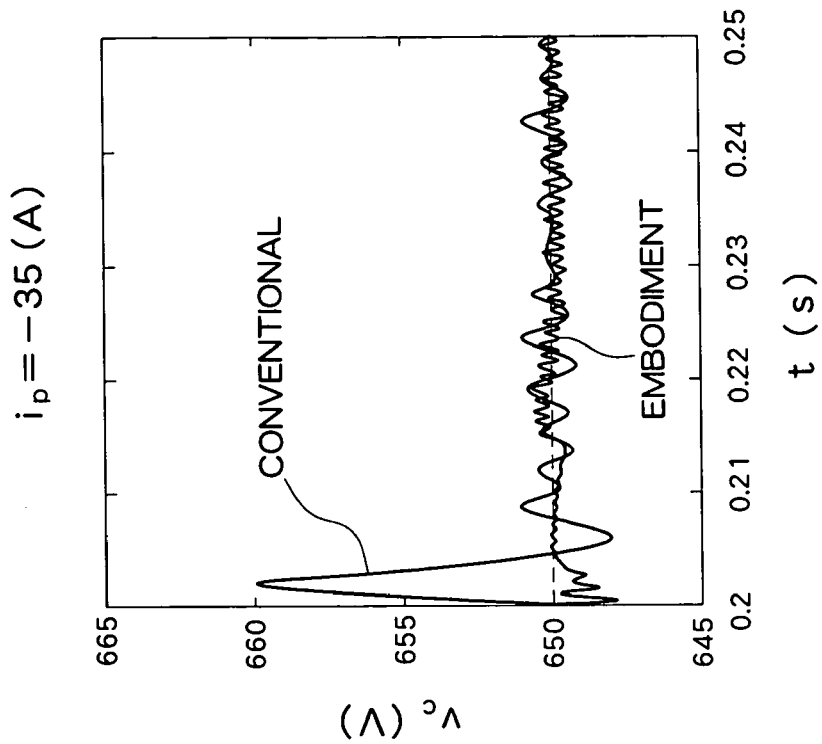
Figure 7C:
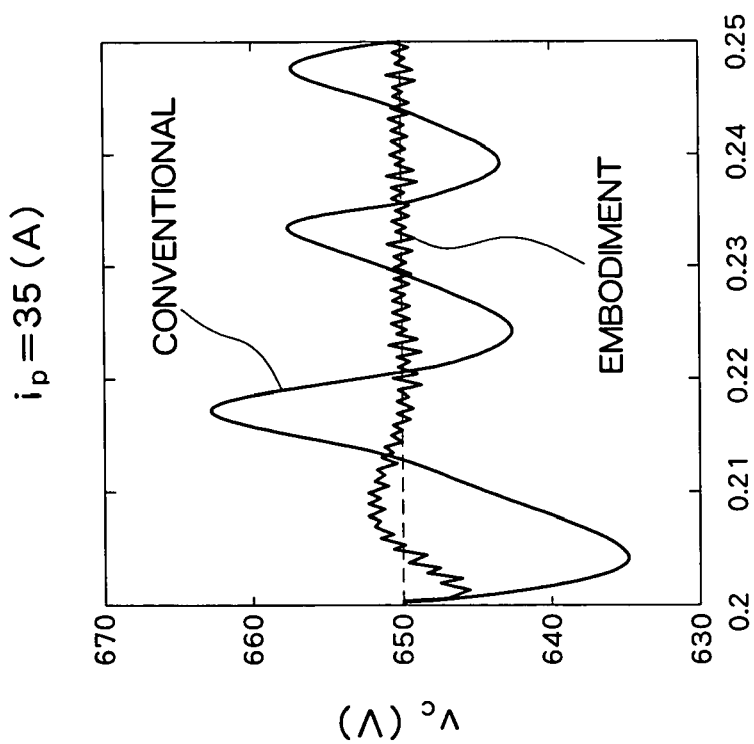
Figure 7F:
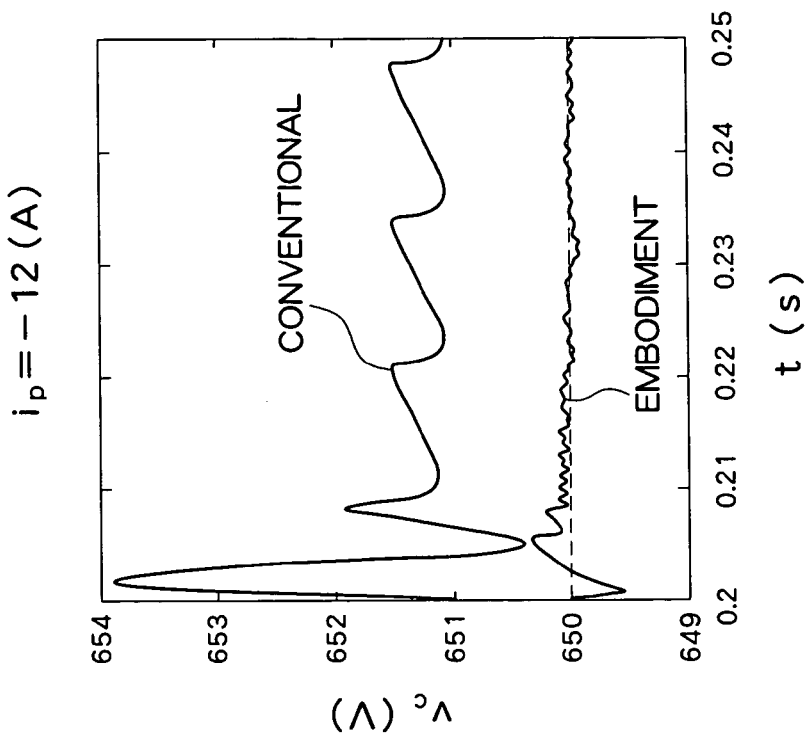
Figure 7E:
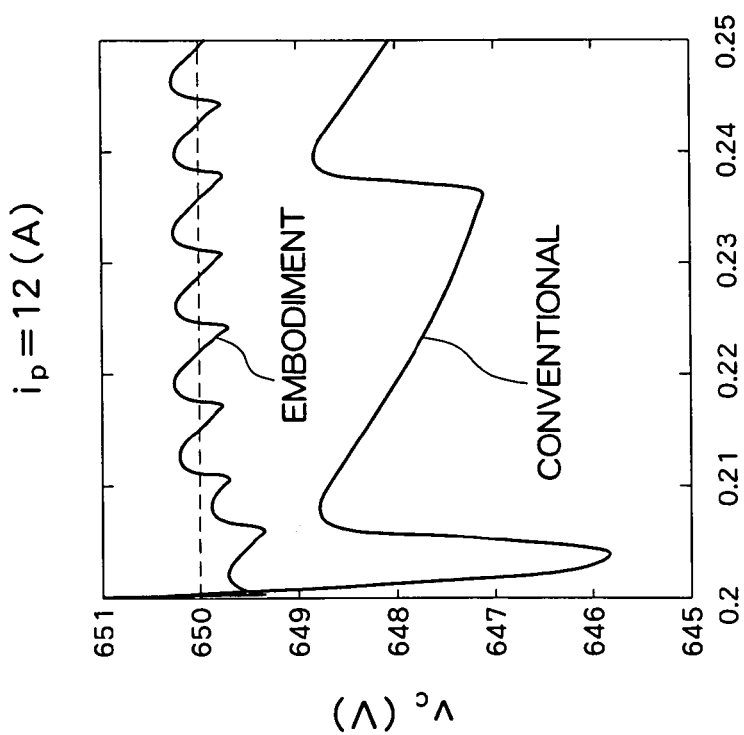

FIG. 3 is a block diagram showing the DC/DC converter system according to Equation (6) into which the control system according to Equation (13) is incorporated.

In FIG. 3, a feedback system for performing PI control is added to the system of FIG. 2. More specifically, a difference calculator is used to calculate an error between output $\xi$ and target value $\xi_r$. Subsequently, the calculated error is multiplied by proportional coefficient $K_{P1}$ to obtain a proportional term. Further, the calculated error is integrated and then multiplied by coefficient $K_{i1}$ to obtain an integral term. The proportional term and the integral term are added to obtain input v.

Because the system comprising input v and output $\xi$ is linear, feedback control of the system can be easily executed by PI control.

The system characteristic of the linearized system can be confirmed as below. By substituting Equation (11) into Equation (6), the following equations are obtained.

$$\frac{d}{dt}\begin{pmatrix} \xi_1 \\ \xi_2 \end{pmatrix} = \begin{pmatrix} 0 & 1 \\ -\omega_c^2 & -2\eta\omega_c \end{pmatrix}\begin{pmatrix} \xi_1 \\ \xi_2 \end{pmatrix} - \begin{pmatrix} 0 & 0 \\ -\omega_c^2 & -2\eta\omega_c \end{pmatrix}\begin{pmatrix} \xi_{r1} \\ \xi_{r2} \end{pmatrix} + \begin{pmatrix} 0 \\ 1 \end{pmatrix}v_i + \begin{pmatrix} 1 \\ 0 \end{pmatrix}w \quad (15)$$

$$\frac{d}{dt}v_i = \int (\xi_{r1} - \xi_1) dt \quad (16)$$

According to this control, system responsiveness is determined by $\omega_c$, while damping is determined by $\eta$.

In a control using Equation (12) in place of Equation (11), system responsiveness is determined by $\omega_c$, damping characteristic during a transitional period is determined by $\eta$, and a characteristic with respect to steady-state voltage offset is determined by $v_c$ (these are only approximate statements which are slightly inexact because $\xi$ and $v_c$ are actually not independent from one another).

Next described is a method for calculating target values $\xi_{r1}$ and $\xi_{r2}$. Here, load current $i_p$ is assumed to be known. First, zero is substituted as the derivative value for Equations (1) and (2) so as to obtain Equations (17) and (18). Subsequently, $k_\gamma$ is eliminated from these equations to obtain Equation (19). It is assumed that, in Equation (19), the capacitor voltage is equal to the target value. Accordingly, target battery current value $i_{br}$ is calculated by Equation (20).

$$0 = \frac{1}{c}(-k_\gamma i_b - i_p) \quad (17)$$

$$0 = \frac{1}{L}\{k_\gamma v_c - (R_b i_b + V_b)\} \quad (18)$$

$$R_b i_b^2 + V_b i_b + i_p v_c = 0 \quad (19)$$

$$i_{br} = -\frac{V_b - \sqrt{V_b^2 - 4R_b V_{cr} i_p}}{2R_b} \quad (20)$$

Target values $\xi_{r1}$ and $\xi_{r2}$ are determined using Equations (7) and (8) by assuming $i_b = i_{br}$ and $v_c = V_{cr}$. It is assumed that $i_{br} = 0$ holds true when $V_b^2 - 4R_b V_{cr} i_p < 0$.

Alternatively, it is determined as below using Equations (17) and (18).

$$\xi_{r2} = (R_b i_b + V_b)i_b = \begin{cases} -i_p v_c \approx -i_p V_{cr} & (\text{if } R_b i_b + V_b \geq 0) \\ 0 & (\text{if } R_b i_b + V_b < 0) \end{cases} \quad (21)$$

Target values $\xi_{r1}$ and $\xi_{r2}$ determined as above are used in the configuration shown in FIG. 3 so as to perform the system control as defined by Equations (13) and (14).

Explanation of Physical Significance of the Method According to the Preferred Embodiment The physical significance of Equations (1) and (2) is explained as follows. $(1/2)cv_c^2$ denotes energy of the capacitor 18, $(1/2)L_r i_b^2$ denotes energy of the reactor, $v_c i_p$ denotes power between the motor and the capacitor, and $-i_b(R_b i_b + V_b)$ denotes power of the battery. Accordingly, the first row of Equation (6) is a balance equation concerning power of the DC/DC converter system.

Further, the second row of Equation (6) is a balance equation concerning the battery power. This equation can be simplified as below by assuming $V_b \gg \|R_b i_b\|$.

$$\frac{d}{dt}(-i_b V_b) = -\frac{V_b}{L_r} v_c \left( k_\gamma - \frac{V_b}{v_c} \right) \quad (22)$$

$$-V_b \frac{d}{dt}(i_b) = -V_b^2 \frac{1}{L_r} v_c \left( \frac{k_\gamma}{V_b} - \frac{1}{v_c} \right)$$

$$L_r \frac{d}{dt}(i_b) = v_c k_\gamma - V_b$$

In other words, the second row of Equation (6) may also be considered as a voltage equation related to the reactor current, and therefore as an equation which expresses the behavior of the battery current.

Next, what is performed by the control according to Equation (11) with respect to an actual input $k_\gamma$ is confirmed as below. Equation (11) is substituted into Equation (10), and the obtained equation is simplified to isolate $k_\gamma$. Here, $K_{P1} = \omega_c^2$ and $K_{P2} = 2\eta\omega_c^2$ hold true, the assumptions of $(1/2)cv_c^2 \gg (1/2)L_r i_b^2$ and $R_b i_b \ll V_b$ are adopted, and approximations of $\xi_1 \approx (1/2)cv_c^2$ and $\xi_2 \approx -V_b i_b^2$ are employed. (The symbol "$\approx$" denotes "nearly equal to".)

$$k_\gamma = \frac{R_b i_b + V_b}{v_c} - \frac{L_r}{(2R_b i_b + V_b)v_c} v \quad (23)$$

$$= \frac{R_b i_b + V_b}{v_c} - \frac{L_r}{(2R_b i_b + V_b)v_c} \{ (K_{p1} \quad K_{p2})$$

$$\begin{pmatrix} \xi_{r1} - \xi_1 \\ \xi_{r2} - \xi_2 \end{pmatrix} + K_i \int (V_{cr} - v_c) dt \}$$

$$= \frac{R_b i_b + V_b}{v_c} - \frac{L_r}{(2R_b i_b + V_b)v_c} \{ \frac{C}{2} K_{p1} (V_{cr}^2 - v_c^2) -$$

$$(i_{br} - i_b) + K_i \int (V_{cr} - v_c) dt \}$$

$$= \frac{R_b i_b + V_b}{v_c} + \frac{L_r C K_{p1}}{2(2R_b i_b + V_b)v_c} (-V_{vr}^2 + v_c^2) +$$

$$\frac{L_r K_i}{(2R_b i_b + V_b)} \int (-V_{cr} + v_c) dt + \frac{V_b L_r K_{p2}}{(2R_b i_b + V_b)v_c} (i_{br} - i_b)$$

Further, by assuming that the width of voltage oscillation is small with respect to the target value and by again adopting the above assumptions of $R_b i_b \ll V_b$ and $V_{cr} \gg v_c$, Equation (23) can be simplified into Equation (24) below.

$$k_\gamma = \frac{R_b i_b + V_b}{V_{cr}} + \frac{L_r C K_{p1}}{2V_b} (-V_{cr} + v_c) + \quad (24)$$

$$\frac{L_r K_i}{V_b V_{cr}} \int (-V_{cr} + v_c) dt + \frac{V_b L_r K_{p2}}{V_b V_{cr}} (i_{br} - i_b)$$

In Equation (24), the first term represents a feed forward control of the duty ratio, the second and third terms represent the proportional and integral positive feedback with respect to the voltage, and the fourth term represents a negative feedback with respect to the battery current.

For cases in which $V_{cr}$ is constant, Equation (13) can be further simplified into Equation (25), wherein $V_b$ denotes a measured battery voltage value.

$$k_\gamma = -\frac{L_r}{(2v_b - V_b)V_{cr}} \quad (25)$$

$$\{ K_{p1}(V_{cr} - v_c) + K_{p2}(\xi_{r2} - i_b v_b) + K_i \int (V_{cr} - v_c) dt \} + \frac{v_b}{V_{cr}}$$

As such, the control according to the above-described embodiment includes a feed forward control of the duty ratio, a proportional and integral positive feedback with respect to the voltage, and a negative feedback for the battery current. Furthermore, a scheduling factor of $L_r/((2v_b-V_b)V_{cr})$ is applied to the terms for the proportional and integral positive feedback with respect to the voltage and to the term for the negative feedback for the battery current. With this arrangement, control of the DC/DC converter can be accomplished with sufficiently high accuracy.

Verification by Simulation

The operation of the DC/DC converter according to the above-described embodiment was verified by simulation, and the results are described as below.

1) Simulation Conditions

Equations (1) and (2) were used for the simulation. The conventional voltage feedback control and the method according to the above embodiment (according to Equations (6)–(10) and (11)) were employed for the control systems.

The controllers were tuned at $i_p=-35$ A. For the controller using the conventional method, a low gain was set in the region where $i_p>0$ in order to prevent oscillations.

During the simulation, the behaviors of capacitor voltage and battery current were examined while varying the load current $i_p$ from 0 A to each selected value in a one-step manner. Considering the fact that the range of current which can be made to steadily flow in the DC/DC converter of the present embodiment was limited to $-1323$ A($V_b^2/(4V_{cr}R_b)$) ~45.25 A(($V_b-V_{cr}$)/$R_b$), the step widths of $i_p$ were selected to be 50 A, 35 A, 12 A, $-12$ A, $-35$ A, and $-50$ A. Assuming that the capacitor voltage is 650V, the above current values correspond to application of loads of 33 kW, 23 kW, 8 kW, $-8$ kW, $-23$ kW, and $-50$ kW, respectively.

2) Simulation Results

The groups of FIGS. 4(a)–4(f), FIGS. 5(a)–5(f), and FIGS. 6(a)–6(f) illustrate the Lissajous waveforms of capacitor voltage $v_c$ and battery current $i_b$ obtained when using a continuous system controller, a discrete system controller, and a discrete system controller along with PWM switching, respectively. In each of the groups of graphs, graphs (a), (c), (e), (b), (d), and (f) show the results obtained when the load current was changed in a one-step manner from 0 A to 50 A, 35 A, 12 A, $-12$ A, $-35$ A, and $-50$ A, respectively.

The following points can be concluded from FIGS. 4(a)–4(f), FIGS. 5(a)–5(f), and FIGS. 6(a)–6(f).

(i) When $i_p$ exceeds the upper limit value of steady-state current, the voltage cannot be maintained at the target value using either of the conventional method or the method of the present embodiment. When employing a discrete system control, deviations are large, and oscillations continue according to the present method. For $i_p$ in this range, it is necessary to provide a different control in order to maintain $i_p$ lower than the upper limit value. (Refer to FIGS. 4(a), 5(a), and 6(a).)

(ii) When $i_p$ is within the steadily allowable range, according to both the present method and the conventional method, oscillating behaviors are more strongly exhibited in the region where $i_p>0$ compared to in the region where $i_p<0$. Meanwhile, compared to when using the conventional method, the magnitudes of the oscillations are smaller and convergence is achieved faster according to the present method. It should be noted that, according to both methods, the waveforms do not converge to a constant value but converges to a limit cycle. The limit cycle results from the switching operation. In order to minimize this phenomenon of the capacitor voltage, it is considered that a coordinated operation with an inverter on the load side is necessary. (Refer to FIGS. 4(b)–4(f), FIGS. 5(b)–5(f), and FIGS. 6(b)–6(f).)

(iii) Within the steadily allowable range of $i_p$, when the magnitude (absolute value) of $i_p$ is greater, the oscillation widths of $v_c$ and $i_b$ become greater. When the magnitude of load is 8 kW ($i_p=\pm12$ A) and PWM is employed, the oscillation widths of $v_c$ and $i_b$ are 2V and 20 A according to the conventional method, whereas the oscillation widths of $v_c$ and $i_b$ are 0.5V and 15 A according to the present method. (Refer to FIGS. 4(e) and 4(f), FIGS. 5(e) and 5(f), and FIGS. 6(e) and 6(f).)

FIGS. 7(a)–7(f) show time response waveforms of capacitor voltage $v_c$ obtained when a discrete system controller and PWM switching are employed. FIGS. 7(a), 7(c), 7(e), 7(b), 7(d), and 7(f) show the results obtained when the load current was changed in a one-step manner from 0 A to 50 A, 35 A, 12 A, $-12$ A, $-35$ A, and $-50$ A, respectively. An explanation of the case where $i_p=50$ is omitted in the following discussion of the response characteristics.

The response time according to the present method is approximately 10 ms in the region where $i_p \leq 12$ A, and approximately 15 ms in the region where $i_p \leq 35$ A. It should be noted that this statement concerning the response time is made while disregarding oscillations having a width smaller than 0.5 A, such as those appearing in FIG. 7(e). In contrast, the response time according to the conventional method is approximately 15 ms in the region where $i_p \leq 12$ A, and approximately 200 ms in the region where $i_p \leq 35$ A (although this is not shown in the graphs). Based on these results, it is confirmed that the responsiveness of the present method is improved compared to that of the conventional method.

Factors for Enhancement of Control Performance

The factors which created a difference in the control performance of the present method as compared to that of the conventional method are considered to be as below.

(1) The control gain could be increased in the entire region by means of the linearization and the feedback for battery current.

(2) By eliminating the lower limit of the duty ratio γ, an increase in the battery current could be effected in a shorter period of time.

By employing the results obtained under the continuous system control, these two factors are verified in the section below as differences in behavior between the conventional method and the present method.

Figure 8:
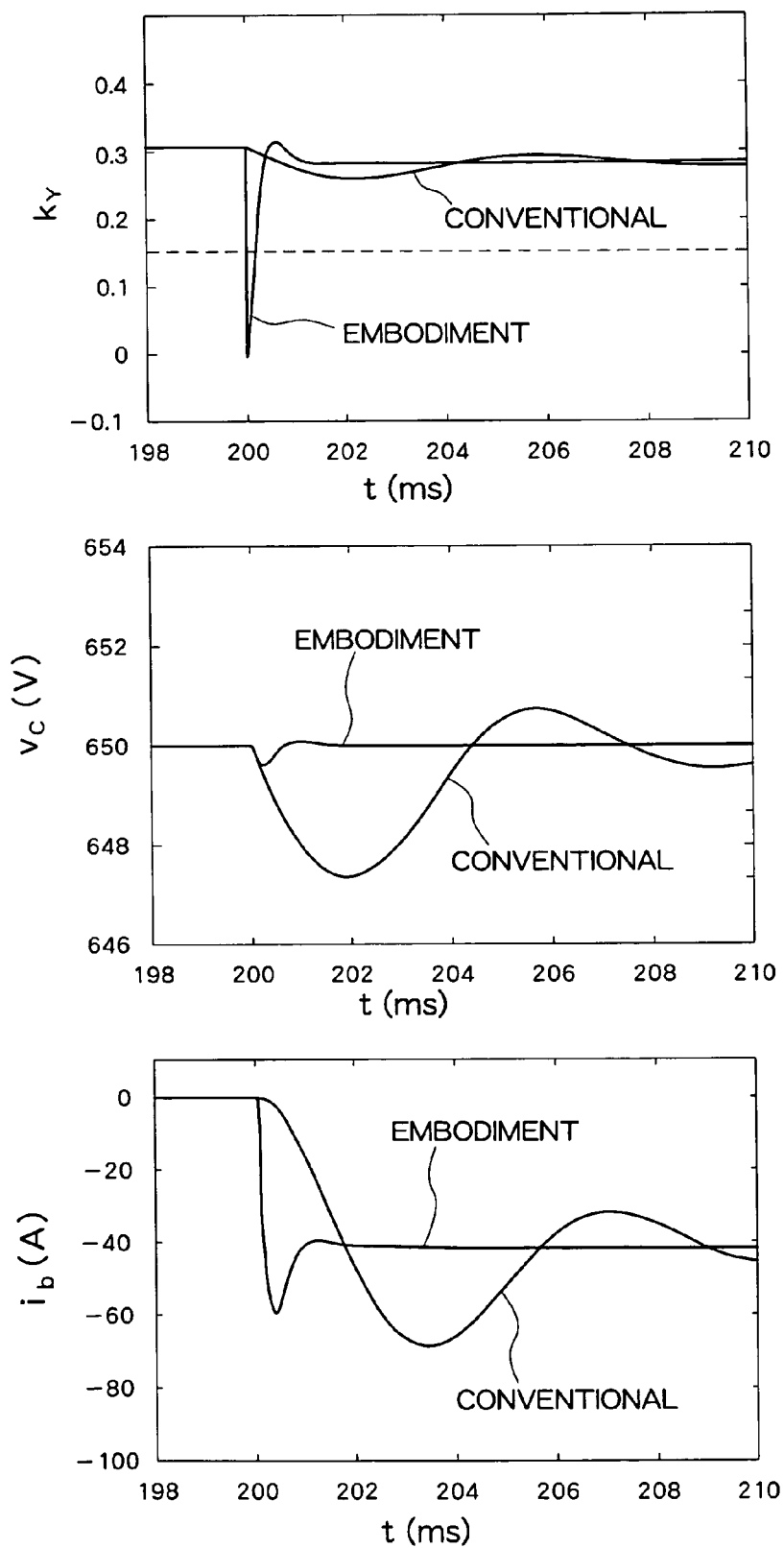
FIG. 8 graphically illustrates the content of a control executed when the load current is 12A.

FIG. 8 shows comparison results of $k_\gamma$, $v_c$, and $i_b$ between the present method and the conventional method in a case where the load current is 12 A (that is, the load current is increased from 0 A to 12 A in a one-step manner). According to the present method, at the point at which the load starts drawing current out from the capacitor (t=200 ms in this case), $k_\gamma$ is drastically reduced so as to increase the battery current $i_b$. In doing so, the lower limit value of the duty ratio according to the conventional method is surpassed. It can be confirmed that, by allowing the battery current to rise quickly, decrease in the capacitor voltage is minimized. As such, it can be concluded that the factors which contributed to the quick increase of the control gain are the fact that the control gain according to the present method is sufficiently large in the corresponding region and the fact that the duty ratio of the present embodiment is permitted to surpass the lower limit value of the duty ratio of the conventional method.

Resonance of the Converter System

The particularly noticeable oscillations which resulted in the conventional method in the cases where $i_p=35$ A (corresponding to FIGS. 4(c), 5(c), 6(c), and 7(c)) are analyzed as below. First, resonance of the DC/DC converter system is calculated. Considering the state in which the capacitor voltage with respect to the battery voltage $V_b$ is controlled to target value $V_{cr}$, $k_\gamma=V_b/V_{cr}$ holds true under the condition where $V_b>|R_b i_b|$. Accordingly, Equation (26) can be obtained from Equations (1) and (2). The poles s of Equation (26) are given by Equation (27).

$$\frac{d}{dt}\begin{pmatrix} v_c \\ i_b \end{pmatrix} = \begin{pmatrix} 0 & -\frac{v_b}{V_{cr}c} \\ \frac{V_b}{V_{cr}L_r} & -\frac{R_b}{c} \end{pmatrix} \begin{pmatrix} v_c \\ i_b \end{pmatrix} + \begin{pmatrix} -\frac{1}{c} \\ 0 \end{pmatrix} i_p \tag{26}$$

$$s = \frac{-\frac{R_b}{L_r} \pm \sqrt{\left(\frac{R_b}{L_r}\right)^2 - \frac{4}{L_r c}\left(\frac{V_b}{V_{cr}}\right)^2}}{2} \tag{27}$$

By calculating the poles using the conditions of the above simulation, real roots 98 Hz and 9.7 Hz are obtained.

In a similar manner, by incorporating the conventional control method and performing linearization around the balancing point ($v_c=V_{cr}$, $i_b=100$ A), an oscillation root of 97 Hz (real part: −123 rad/s; imaginary part: ±597 rad/s) and real roots of 76 Hz and 0 Hz are obtained as the poles. Among these poles, the pole which causes oscillations is the oscillation root of 97 Hz. This frequency corresponds to that shown in FIG. 7(c), and is almost identical to the pole 98 Hz which was inherent to the system. In contrast, in graphs other than FIGS. 4(c), 5(c), 6(c), and 7(c), oscillations of approximately 100 Hz are not observed even when the same conventional method is applied. It is considered that this occurs because, in these other cases, the control gain is relatively large and the inherent resonance is thereby suppressed. For example, in the cases of FIGS. 4(d), 5(d), 6(d), and 7(d) where $i_p=-35$ A and the balancing point is ($v_c=V_{cr}$, $i_b=100$ A), by calculating the poles of the system while incorporating the conventional control, an oscillation root of 124 Hz (real part: −358 rad/s; imaginary part: ±693 rad/s) and real roots of 73 Hz and 0 Hz are obtained. Although the oscillation root similarly exists, the magnitude of the real part relative to the imaginary part is greater compared to in the case where $i_p=35$ A, and favorable attenuation is exhibited. It should be noted that the calculated oscillation root of 124 Hz slightly differs from the oscillation frequency (approximately 150 Hz) shown in FIG. 7(d) because the analysis is conducted while performing local linearization.

Battery Current Estimating Unit

A system in which control is executed without using a current sensor for measuring battery current $i_b$ is next described.

Based on Equations (1) and (2), an observer is configured as expressed by the equations below. Because the internal resistance of the battery cannot be measured, the observer is configured to use battery voltage $v_b(=R_b i_b+V_b)$ as the measured value. In the following equations, x denotes column vector ($v_c$, $i_b$) which indicates the state quantity, $x_e$ denotes the estimated value of x, w denotes column vector ($i_p$, $v_b$) which indicates the measured signal, u denotes the control input $k_\gamma$, y denotes the measurable output signal $v_c$, $y_e$ denotes the estimated value of y, and K denotes the observer gain.

$$\frac{d}{dt}x_e = uAx_e + bw + K(y - y_e) \tag{28}$$

$$y_e = Cx_e \tag{29}$$

$$A = \begin{pmatrix} 0 & -1/c \\ 1/L_r & 0 \end{pmatrix} \tag{30}$$

$$B = \begin{pmatrix} -1/c & 0 \\ 0 & -1/L_r \end{pmatrix} \tag{31}$$

$$C = \begin{pmatrix} 1 & 0 \end{pmatrix} \tag{32}$$

Using the same symbols, the system to be controlled can be expressed by the following equations.

$$\frac{d}{dt}x = uAx + bw \quad (33)$$

$$y = Cx \quad (34)$$

This system is bilinear, such that the linear theory cannot be applied. Stability of this observer is verified by substituting a Liapunov function and confirming that the obtained time derivative is negative definite. Here, $e=x-x_e$ holds true, and e' denotes the transposed vector of e.

$$V = e'e \quad (35)$$

$$\frac{d}{dt}V = 2e'u(A + KC)e \quad (36)$$

Because $0 \leq u \leq 1$ holds true, the condition for satisfying dV/dt<0 is that the poles of A+K are negative, which is considered to be identical to the condition for the linear observer. When designing an actual observer, the column vector $K=(k_1, k_2)$ of the observer gain is determined by pole placement in accordance with the above-noted results, as below.

$$uA - KC = \begin{pmatrix} -k_1 & -k_\gamma/c \\ -k_2 + k_\gamma/L_r & 0 \end{pmatrix} \quad (37)$$

The characteristic equation which gives the poles of this matrix is $s^2-sk_1+(k_\gamma/c)(k_2+k_\gamma/L_r)$. Based on this equation and by denoting the resonance frequency at poles with ω and denoting the attenuation coefficient with ζ, the gain is expressed by the following equations.

$$k_2 = -(\omega^2 C/k_\gamma - k_\gamma/L_r) \quad (38)$$

$$k_1 = -(-2\zeta\omega) \quad (39)$$

As such, the gain is a function of duty ratio $k_\gamma$.

Figure 9:
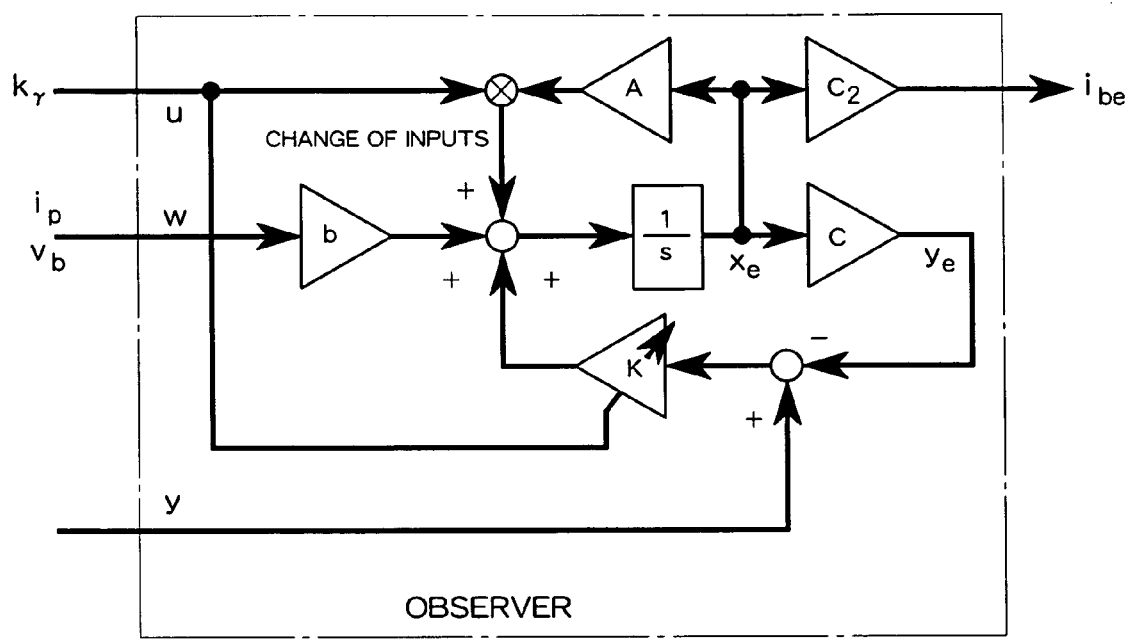
FIG. 9 is a diagram showing a configuration of an observer for estimating battery current $i_b$.

A block diagram of the observer is shown in FIG. 9. As can be seen, the observer realizes Equation (28). $u(=k_\gamma)$, $w(=(i_p, v_b))$, and $y(=v_c)$ are input into the observer. The adding operation on the right side of Equation (25) is performed in an adder, and the sum is integrated to obtain $x_e$. $x_e$ is multiplied by A and u to calculate the first term on the right side, and the calculated result is supplied to the adder. The second term on the right side obtained by multiplying input w by b is supplied to the adder. Further, $x_e$ is multiplied by C to calculate $y_e(=v_{ce})$. The calculated $y_e(=v_{ce})$ is subtracted from input $y(=v_c)$, and this difference is subsequently multiplied by K so as to obtain the third term on the right side, which is also supplied to the adder. It should be noted that K is dependent on $k_\gamma$ as described above. Furthermore, $x_e$ is multiplied by $C_2$ to obtain $i_{be}$, and the obtained $i_{be}$ is output as the estimated value of battery current.

Figure 10:
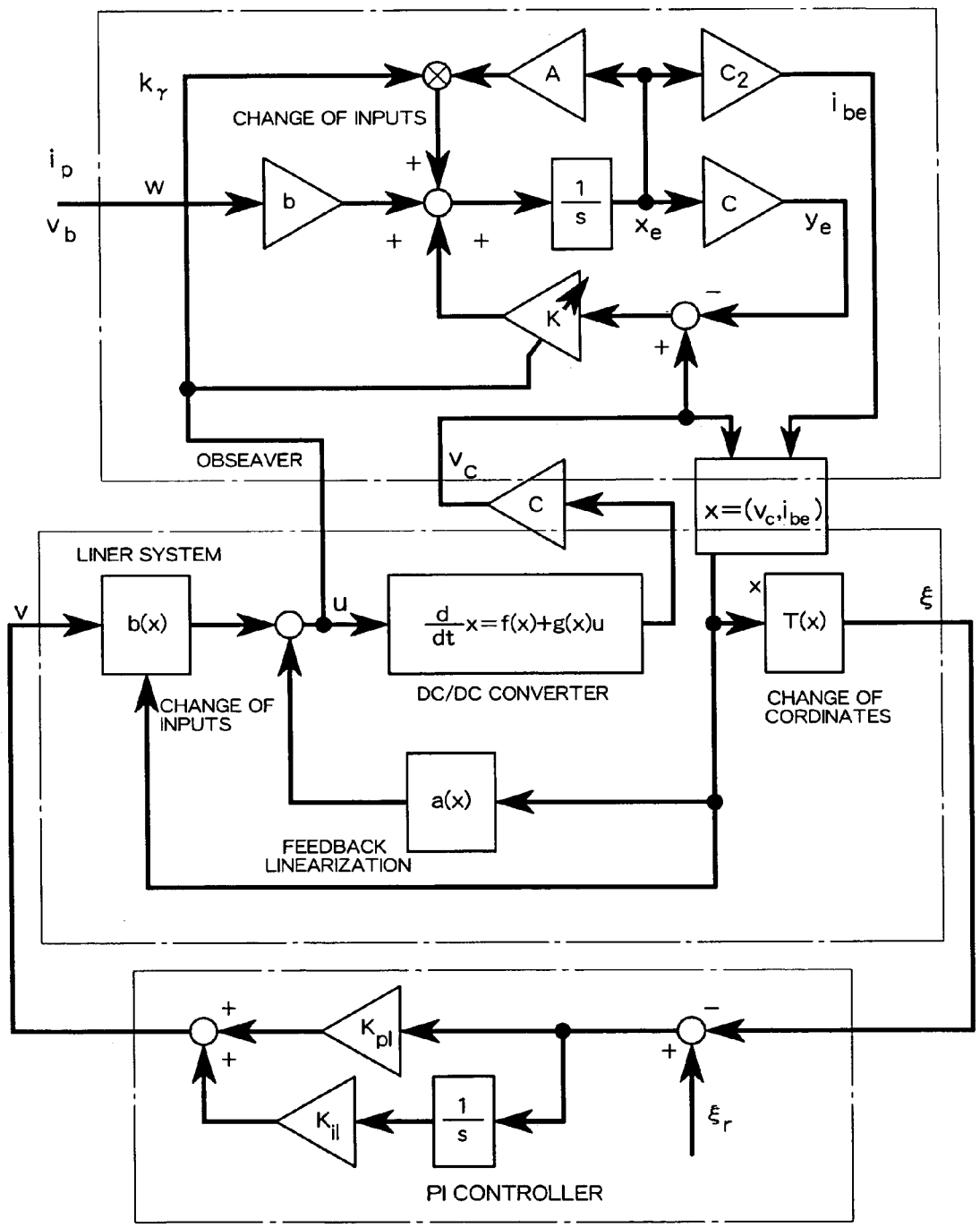
FIG. 10 is a diagram showing a configuration of a control system including the observer of FIG. 9.

FIG. 10 is a block diagram showing a configuration in which the observer of FIG. 9 is incorporated into the control system of FIG. 3.

As can be seen, $u(=k_\gamma)$ and x are supplied from the control system to the observer. It should be noted that x is multiplied by C to be converted into $v_c$ before being input into the observer. Based on $i_{be}$ obtained from the observer and v output from the control system, $x=(v_c, i_{be})$ is formed for inputting into T(x) of the control system. With this arrangement, control can be executed by employing the estimated value $i_{be}$ of battery current obtained using the observer, without measuring the actual battery current $i_b$.

Verification by Simulation

Figure 11:
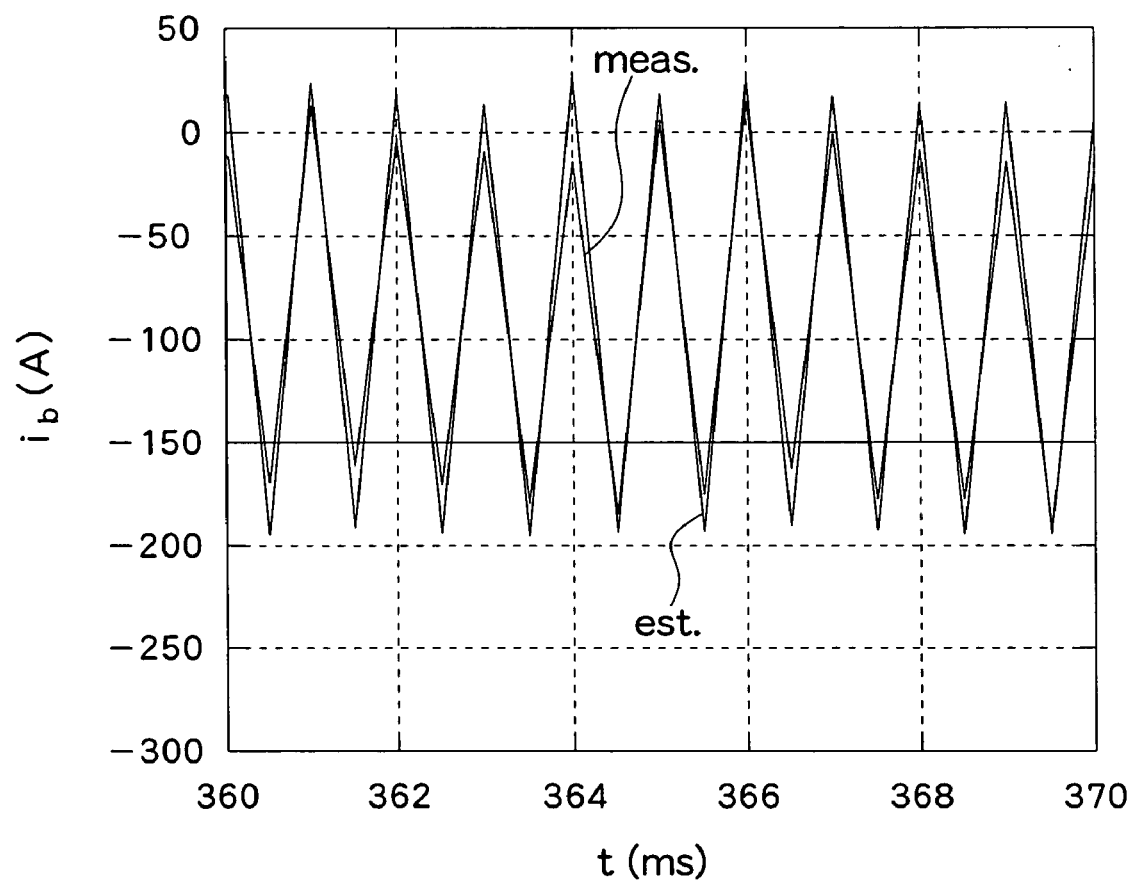
FIG. 11 is a graph showing estimated and measured values of battery current.
Figure 12:
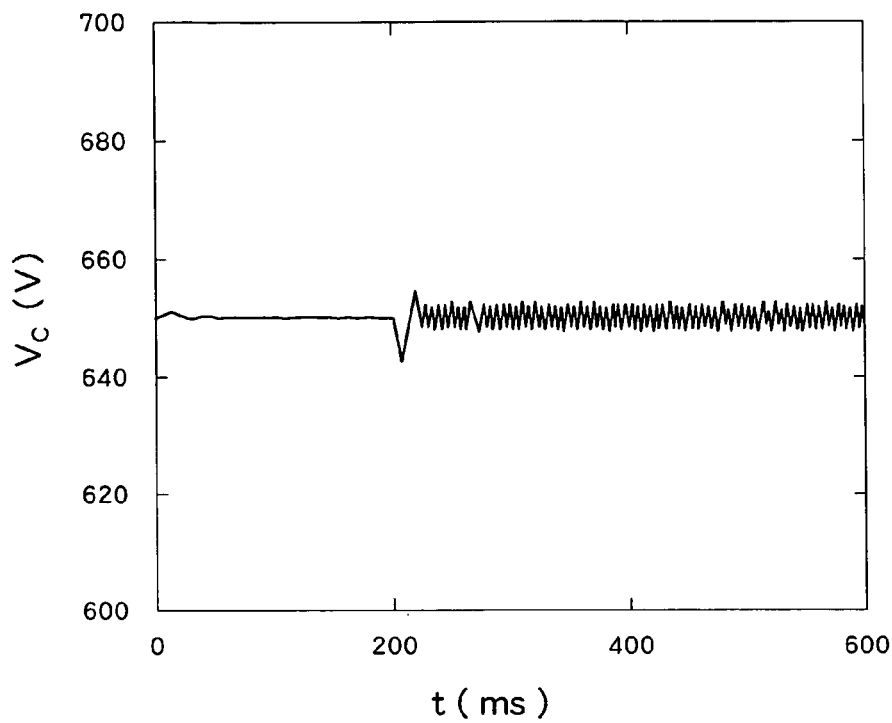
FIG. 12 is a graph showing the battery voltage control performance.
Figure 13:
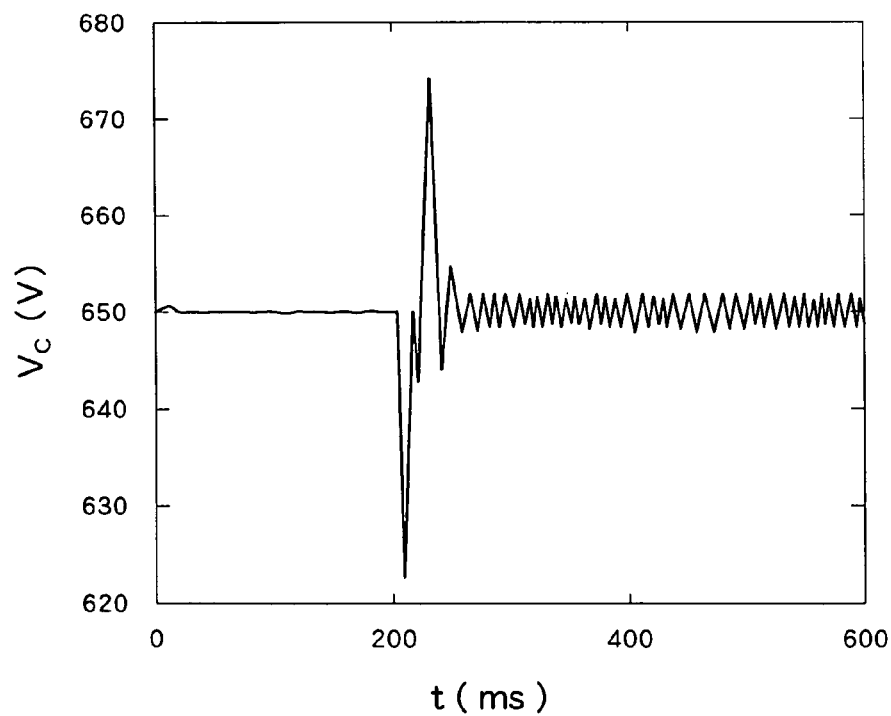
FIG. 13 is a graph showing the capacitor voltage control performance.

The simulation results obtained using the observer are shown in FIGS. 11–13. In FIG. 11 which illustrates the current value estimation accuracy, it can be seen that the estimated values almost exactly follow the actual measured values.

FIGS. 12 and 13 show the voltage control performance achieved when using the estimated values. FIG. 12 illustrates the results for a case in which the control gain is calculated closely in accordance with $k_\gamma$, while FIG. 13 illustrates the results for a case in which the control gain is calculated by assuming a $k_\gamma$ value which is lower than the actual $k_\gamma$ value. From these results, it can be concluded that the voltage $v_c$ control performance can be enhanced by adjusting the control gain K in accordance with $k_\gamma$.

Load Power Estimation Unit

The following methods may be used to estimate the load power.

(1) It is assumed that a motor on the load side is connected via an inverter to the right-hand side of the capacitor in FIG. 1 (namely, to the output terminal), and the motor is driven by the inverter. In this case, load power can be calculated based on electric current information (acquired by means of a current sensor, for use in current control) and voltage command values (supplied to the inverter), both of which are available within an inverter controller. The calculated value is used as $\xi_{r2}$.

Figure 14:
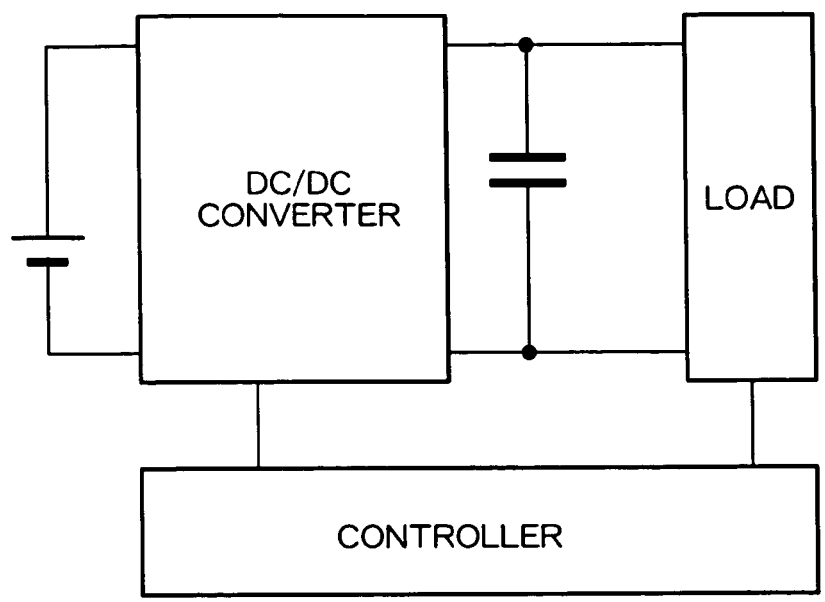
FIG. 14 is a diagram showing a control system configuration in which a common controller is used to control an inverter and a DC/DC converter.

FIG. 14 shows an example configuration in which the above load power estimation is employed. In this configuration, a single controller is employed to perform control of the inverter and the DC/DC converter.

(2) It is assumed that a motor on the load side is connected via an inverter to the right-hand side of the capacitor in FIG. 1 (namely, to the output terminal), and the motor is driven by the inverter. In this case, load power can be calculated based on torque command information and rotational frequency information (derivative values of rotational angle information obtained by means of a resolver or the like) which are available within an inverter controller, while taking into account the motor-inverter efficiency. The calculated value is used as $\xi_{r2}$. Although different information are employed in this method (2) as compared to in the above method (1), this method (2) can be similarly used in the configuration of FIG. 14.

Figure 15:
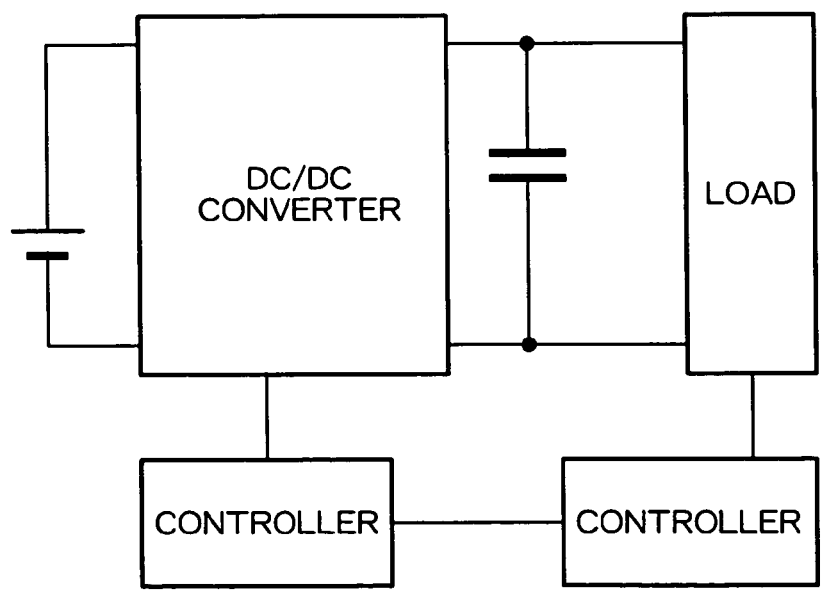
FIG. 15 is a diagram showing a control system configuration in which separate controllers are provided for an inverter and a DC/DC converter, and the controllers perform information exchange.

(3) In a system in which a motor on the load side (namely, on the right-hand side of the capacitor in FIG. 1) is driven by an inverter, and a controller for driving the converter and a controller for driving the inverter are separately provided, torque command values may be supplied from the converter controller to the inverter controller. In such a system, information is communicated between the two controllers according to necessity, so as to perform calculation of load power based on torque command information available within the converter controller and based on rotational frequency information (derivative values of rotational angle information obtained by means of a resolver or the like) which is supplied by communication from the inverter controller. The calculated value is used as $\xi_{r2}$. Considering the fact that changes in rotational frequency are generally slower than torque changes and that delay due to communication becomes more noticeable concerning torque, command values are employed for torque to thereby minimize influences of communication delays. FIG. 15 shows an example configuration in which separate controllers are provided for the inverter and the DC/DC converter, and information transmission is performed between the controllers.

Figure 16:
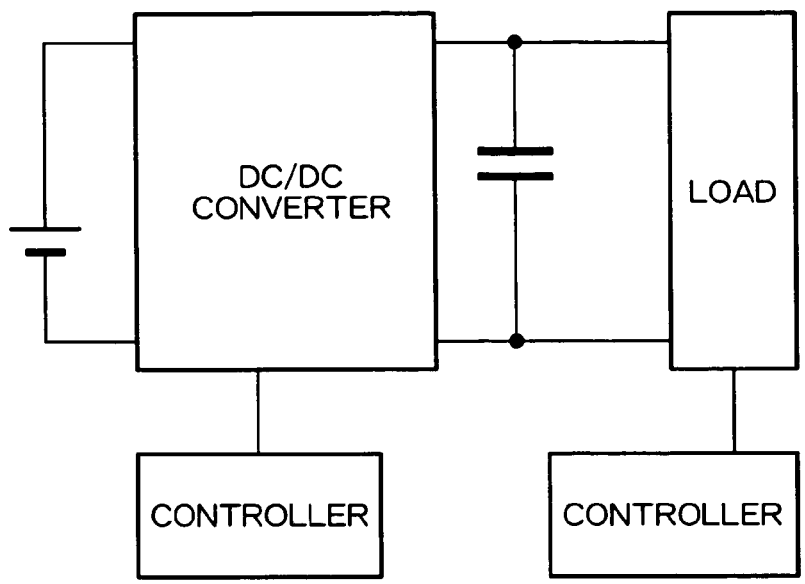
FIG. 16 is a diagram showing a control system configuration in which separate controllers are provided for an inverter and a DC/DC converter, and the controllers do not perform information exchange.

(4) FIG. 16 shows an example configuration in which separate controllers are provided for the inverter and the DC/DC converter, and information transmission is not performed between the controllers. When the DC/DC converter cannot acquire information of the load side as in this case, load side power is calculated using a disturbance observer.

Figure 17:
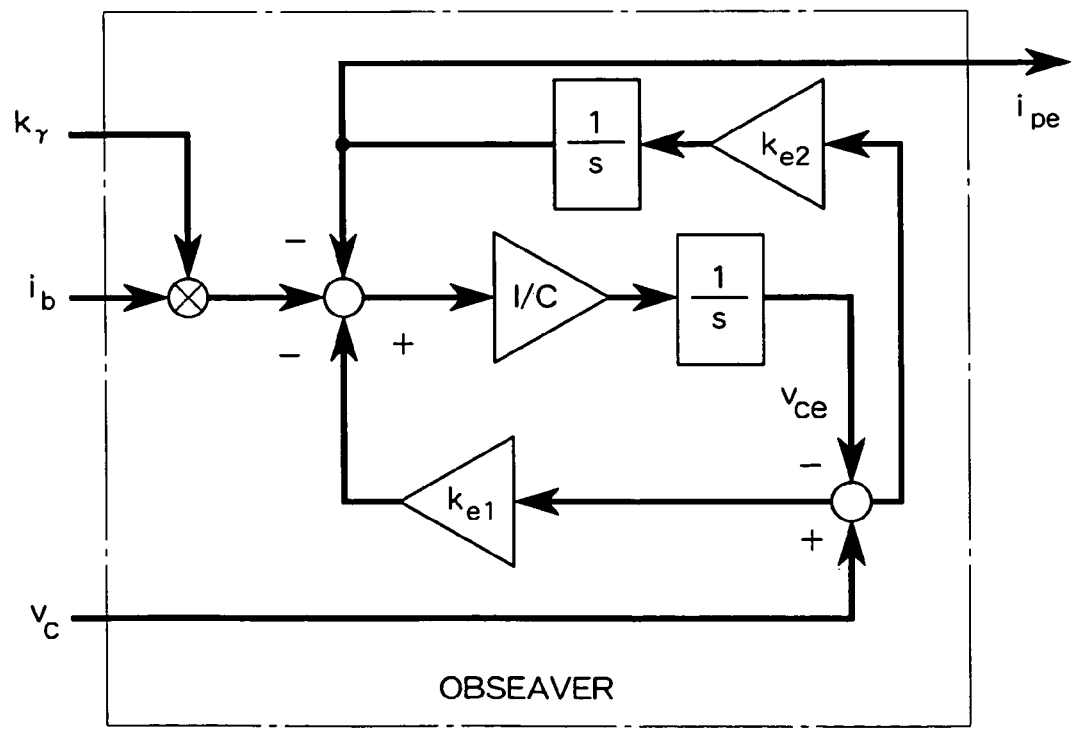
FIG. 17 is a diagram showing a configuration of an observer for estimating load current.

Specifically, a disturbance observer as shown in FIG. 17 is configured based on Equation (1). In FIG. 17 and the equations below, $v_{ce}$ and $i_{pe}$ denote the estimated values of capacitor voltage and load current, respectively, while $K_{e1}$ and $K_{e2}$ denote feedback gains.

According to this disturbance observer, $k_y$, $i_b$, and $v_c$ are input, and estimated value $i_{pe}$ of load current is output. The observer realizes Equations (40) and (41). By substituting the obtained $i_{pe}$ in Equation (42), $\xi_{r2}$ can be calculated.

$$\frac{d}{dt}v_{ce} = \frac{1}{c}(-k_y i_b - i_{pe}) + K_{e1}(v_c - v_{ce}) \quad (40)$$

$$\frac{d}{dt}i_{pe} = K_{e2}(v_c - v_{ce}) \quad (41)$$

$$\xi_{r2} = -i_{pe}v_c \quad (42)$$

What is claimed is:

1. A DC/DC converter control system for controlling a DC/DC converter which receives input of a power source voltage from a DC power source and supplies a converted output voltage, wherein
    the DC/DC converter comprises a reactor through which a current from the DC power source is made to flow, and a pair of switches for switching and controlling the current flowing in the reactor; and
    the control system comprises:
    a feedback control section which controls a duty ratio of the pair of switches based on a difference between the output voltage and its target value;
    a feed forward section which controls the duty ratio of the pair of switches based on a difference between the output voltage and the power source voltage; and
    a scheduling section which corrects a feedback control performed in the feedback control section by multiplying a control value obtained in the feedback control by a scheduling factor incorporating the output voltage, the power source voltage, a voltage decrease in the power source voltage, and reactance of the reactor.

2. A DC/DC converter control system as defined in claim 1, wherein
    the feedback section further includes a section which controls the duty ratio of the pair of switches based on a difference between power of the DC power source and its target value.

3. A DC/DC converter control system as defined in claim 1, wherein
    the feedback section includes both a control value which is proportional to the difference between the output voltage and its target value and a control value which is proportional to an integral value of said difference.

4. A DC/DC converter control system as defined in claim 1, wherein
    inputs of DC power source current, DC power source voltage, output current, and output voltage which are input into the control system are subjected to a predetermined conversion, while the duty ratio to be output is also subjected to a predetermined conversion, such that the control system is configured to be linear.

5. A DC/DC converter control system as defined in claim 1, wherein
    the content of control is simplified by assuming that the output voltage is constant.

6. A DC/DC converter control system as defined in claim 1, wherein
    the control system further comprises an estimation section which estimates DC power source current based on DC power source voltage, output current, and output voltage, and employs an estimated value of DC power source current obtained by means of the estimation section.

7. A DC/DC converter control system as defined in claim 6, wherein
    the estimation section estimates the DC power source current while taking into account the duty ratio.

8. A DC/DC converter control system as defined in claim 1, wherein
    an output from the DC/DC converter is employed for driving a motor via an inverter; and
    output power of the DC/DC converter is estimated based on control information of the inverter.

9. A DC/DC converter control system for controlling a DC/DC converter which receives input of a power source voltage from a DC power source and supplies a converted output voltage, wherein
    the DC/DC converter comprises a reactor through which a current from the DC power source is made to flow, and a pair of switches for switching and controlling the current flowing in the reactor; and
    the control system comprises:
    a feedback control section which controls a duty ratio of the pair of switches based on a difference between output energy and its target value;
    a feed forward section which controls the duty ratio of the pair of switches based on a difference between the output voltage and the power source voltage; and
    a scheduling section which corrects a feedback control performed in the feedback control section by multiplying a control value obtained in the feedback control by a scheduling factor incorporating the output voltage, the power source voltage, a voltage decrease in the power source voltage, and reactance of the reactor.

10. A DC/DC converter control system as defined in claim 9, wherein
    the feedback section further includes a section which controls the duty ratio of the pair of switches based on a difference between power of the DC power source and its target value.

11. A DC/DC converter control system as defined in claim 9, wherein
    the feedback section includes both a control value which is proportional to the difference between the output voltage and its target value and a control value which is proportional to an integral value of said difference.

12. A DC/DC converter control system as defined in claim 9, wherein inputs of DC power source current, DC power source voltage, output current, and output voltage which are input into the control system are subjected to a predetermined conversion, and the duty ratio to be output is also subjected to a predetermined conversion, such that the control system is configured to be linear.

13. A DC/DC converter control system as defined in claim 9, wherein the content of control is simplified by assuming that the output voltage is constant.

14. A DC/DC converter control system as defined in claim 9, wherein the control system further comprises an estimation section which estimates DC power source current based on DC power source voltage, output current, and output voltage, and employs an estimated value of DC power source current obtained by means of the estimation section.

15. A DC/DC converter control system as defined in claim 14, wherein the estimation section estimates the DC power source current while taking into account the duty ratio.

16. A DC/DC converter control system as defined in claim 9, wherein an output from the DC/DC converter is employed for driving a motor via an inverter; and output power of the DC/DC converter is estimated based on control information of the inverter.

* * * * *

UNITED STATES PATENT AND TRADEMARK OFFICE
CERTIFICATE OF CORRECTION

PATENT NO. : 7,129,685 B2
APPLICATION NO. : 11/180574
DATED : October 31, 2006
INVENTOR(S) : Hideo Nakai et al.

It is certified that error appears in the above-identified patent and that said Letters Patent is hereby corrected as shown below:

On Title Page

Please correct the title page as follows:

Item (73) Assignee: should read    Toyota Jidosha Kabushiki Kaisha, Toyota (JP)

Signed and Sealed this

Twentieth Day of March, 2007

JON W. DUDAS
*Director of the United States Patent and Trademark Office*